US008825703B2

(12) United States Patent
Ohtake et al.

(10) Patent No.: US 8,825,703 B2
(45) Date of Patent: Sep. 2, 2014

(54) CONTROL DEVICE, CONTROL METHOD, AND STORAGE MEDIUM

(75) Inventors: Tomohiro Ohtake, Kawasaki (JP); Akihiko Matsuo, Kawasaki (JP); Toshihiro Kodaka, Kawasaki (JP); Kenji Oki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/329,837

(22) Filed: Dec. 19, 2011

(65) Prior Publication Data

US 2012/0239698 A1 Sep. 20, 2012

(30) Foreign Application Priority Data

Mar. 16, 2011 (JP) ................................ 2011-058539

(51) Int. Cl.
*G06F 17/30* (2006.01)
(52) U.S. Cl.
USPC ........................... 707/781; 707/782; 707/783
(58) Field of Classification Search
USPC ......................................... 707/781, 782, 783
See application file for complete search history.

(56) References Cited

U.S. PATENT DOCUMENTS

| 5,944,823 | A | 8/1999 | Jade et al. | |
|---|---|---|---|---|
| 7,464,381 | B1* | 12/2008 | Nickerson et al. | 719/311 |
| 2005/0138417 | A1* | 6/2005 | McNerney et al. | 713/201 |
| 2006/0106759 | A1* | 5/2006 | Nemoto et al. | 707/2 |
| 2006/0143189 | A1* | 6/2006 | Imaeda et al. | 707/100 |
| 2007/0156659 | A1* | 7/2007 | Lim | 707/3 |
| 2008/0162329 | A1 | 7/2008 | Knapp et al. | |
| 2008/0307340 | A1 | 12/2008 | Kojima et al. | |
| 2009/0164517 | A1* | 6/2009 | Shields et al. | 707/104.1 |
| 2009/0178106 | A1* | 7/2009 | Feng et al. | 726/1 |
| 2012/0005233 | A1* | 1/2012 | Matsumoto et al. | 707/797 |
| 2012/0197907 | A1* | 8/2012 | Malyshev et al. | 707/749 |

FOREIGN PATENT DOCUMENTS

| JP | 2000-505270 | 4/2000 |
|---|---|---|
| JP | 2009-15816 A | 1/2009 |
| JP | 2010-055560 | 3/2010 |
| JP | 2010-514073 | 4/2010 |
| JP | 2010-287078 A | 12/2010 |
| WO | WO-98/18248 | 4/1998 |
| WO | WO-2008/077078 | 6/2008 |
| WO | 2011/072993 A1 | 6/2011 |

OTHER PUBLICATIONS

"Secure Data Connector Developer's Guide: Overview", http://code.google.com/intl/ja/securedataconnector/docs/1.3/overview.html (viewed on Feb. 2, 2011).

(Continued)

*Primary Examiner* — Noosha Arjomandi
(74) *Attorney, Agent, or Firm* — Fujitsu Patent Center

(57) ABSTRACT

A first computer establishes a connection between a second computer and the first computer when a specific request for access to a specific path from the second computer is accepted. The first computer transmits to the second computer a script for enabling the second computer to perform a proxy process of accepting a database access request for access to a database from an application to be accessed by the second computer, accessing the database, and acquiring an access result from the database. Then, the first computer receives a database access result from the second computer, and outputs the result to the application.

9 Claims, 21 Drawing Sheets

(56) References Cited

OTHER PUBLICATIONS

Japanese Office Action mailed on Jun. 17, 2014 for corresponding Japanese Application No. 2011-058539, with Partial English Translation, 5 pages.

Inui, Atsuyuki et al., "Server-side execution feature of Data-Detached Application Model", Proceedings of FIT2009, the 8th Forum on Information Technology, Information Processing Society of Japan, Aug. 20, 2009, the fourth part, peer-reviewed and general papers on Network, pp. 545-546, with Partial English Translation.

Komatsu, Kensaku, "Thoroughgoing Explanation: HTML5 API guidebook, book of communication-related APIs", Shuwa System Co. Ltd., Dec. 30, 2010, the First edition, pp. 76-92, with Partial English Translation of pp. 76-78.

* cited by examiner

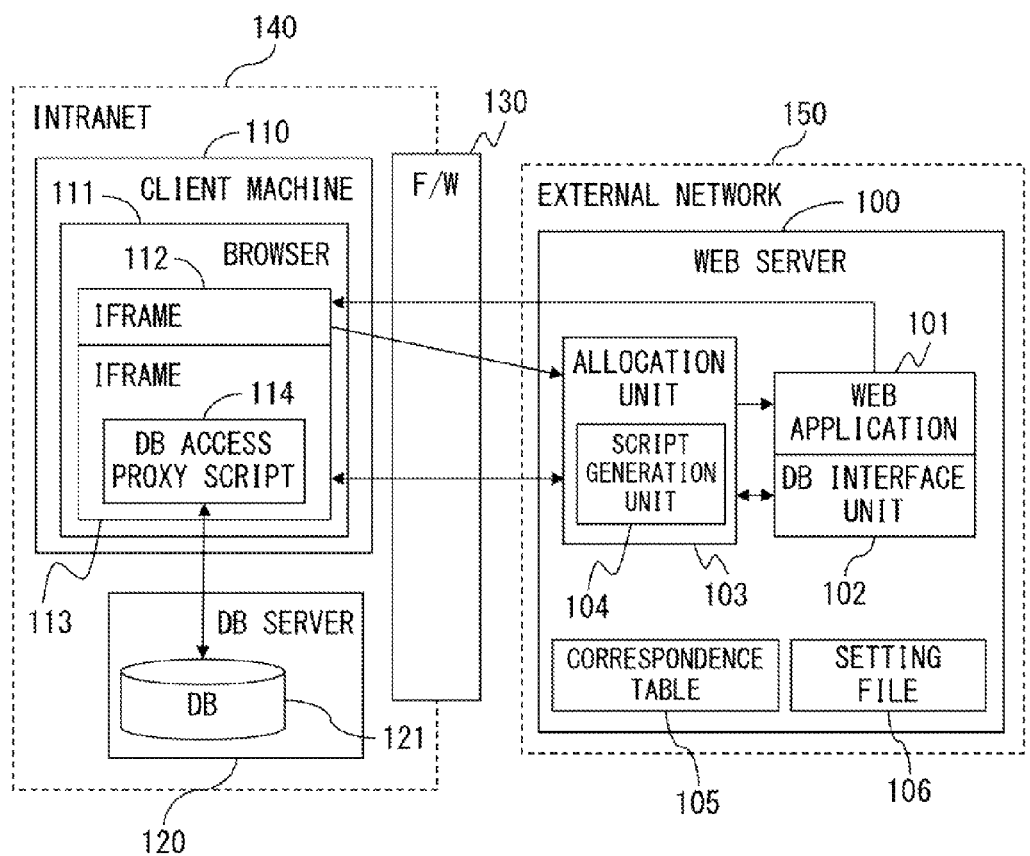
F I G. 1

105a

| SESSION ID | CONNECTION ID |
|---|---|
| A1 | B1 |
| A2 | B2 |
| A3 | B3 |
| ⋮ | ⋮ |

106a

| DB ADDRESS | http://192.168.123.45/ |
|---|---|

FIG. 2

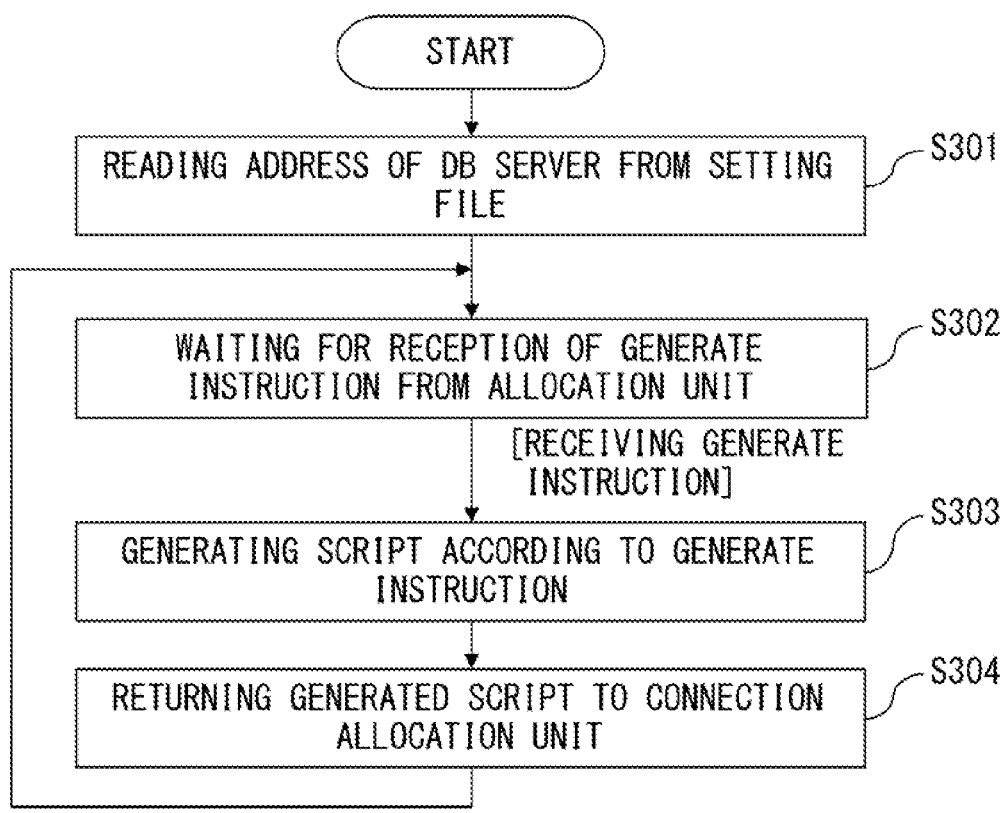
F I G. 7

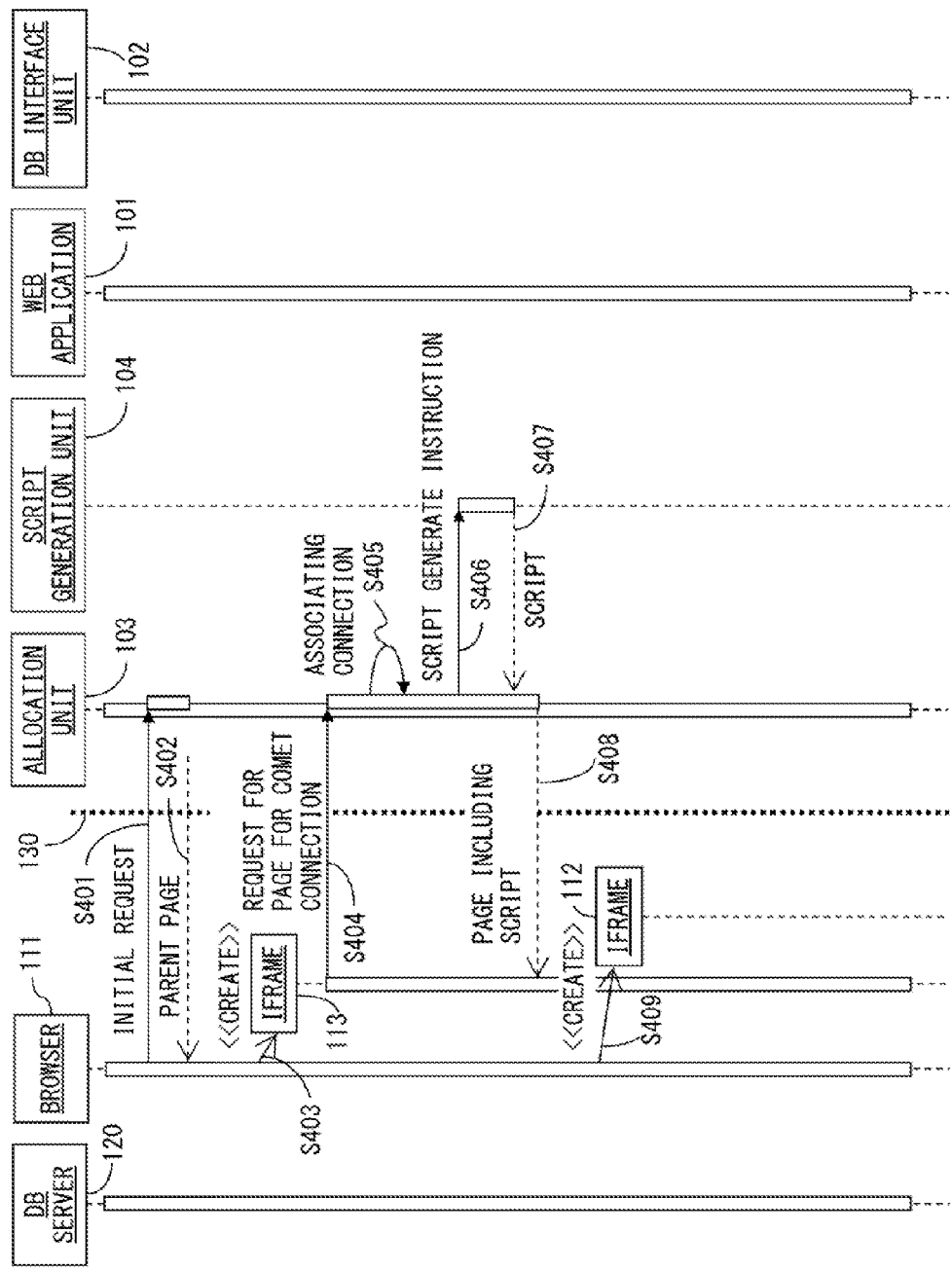

```
                                            ┌─500
┌────────────────────────────────────────────┐
│ <html>                                      │
│ <head></head>                               │
│ <body>                                      │
│ <iframe src="/" width="400" height="600"></iframe>┐─501
│ <iframe src="/_reservedForIframe" width="1"┐│
│ height="1"></iframe>                        ├─502
│ </body>                                     │
│ </html>                                     │
└────────────────────────────────────────────┘

┌─600
┌────────────────────────────────────────────┐
│ <html>                                      │
│ <head>                                      │
│ <script language="JavaScript">              │
│ <!--                                        │
│ var dbAddr="http://192.168.123.45/"; ┐─601  │
│ function execute2(sql) {                    │
│     ......                          ├─602   │
│ }                                           │
│ function main() { ┐─603                     │
│     ......                                  │
│ }                                           │
│ //-->                                       │
│ </script>                                   │
│ </head>                                     │
│                                       ┌─604 │
│ <body>                                      │
│ <script language="JavaScript">main();</script>│
│ </body>                                     │
│ </html>                                     │
└────────────────────────────────────────────┘
```

FIG. 14

106b 
| DB ADDRESS | http://192.168.123.45/ |
|---|---|
| PRIVATE KEY | abcdef0123456789 |
106c 
| DB ADDRESS | http://192.168.123.45/ |
|---|---|
| TABLE NAME ON INTRANET | CLIENT, ORDER |
| TABLE NAME ON INTERNET | GOODS, CART |
(TABLE NAME rows braced as 107)
F I G. 17

CONTROL DEVICE, CONTROL METHOD, AND STORAGE MEDIUM

CROSS-REFERENCE TO RELATED APPLICATIONS

This application is based upon and claims the benefit of priority of the prior Japanese Patent Application No. 2011-058539, filed on Mar. 16, 2011, the entire contents of which are incorporated herein by reference.

FIELD

The embodiments discussed herein relates to the technology of controlling the access to a database (DB).

BACKGROUND

Recently, a Web application is widely used, and various techniques relating to the Web application have been proposed.

A number of Web applications generally use a DB. In this case, the DB may be located in an external network separated by a firewall from an intranet to which a client machine belongs.

However, locating a DB in an external network is a factor of making a user hesitate to use a Web application because the user has some kinds of data to be secret. The user hates to store the secret data in the DB on the external network, and may determine not to use the Web application.

On the other hand, if the DB used by the Web application is within an intranet, then the user data to be secret can be prevented from being stored in a non-volatile manner in a DB on the external network. Therefore, to promote the use of a Web application, it may be effective to place the DB in the intranet.

Patent Document 1: National Publication of International Patent Application No. 2010-514073
Patent Document 2: Japanese Laid-open Patent Publication No. 2010-55560
Patent Document 3: National Publication of International Patent Application No. 2000-505270
Non-patent Document 1: Google Secure Data Connector, http://code.google.com/intl/ja/securedataconnector/docs/1.3/overview.html(viewed on Feb. 2, 2011)

SUMMARY

The program provided according to an aspect of the invention directs a first computer to perform the following controlling process.

The controlling process includes receiving from a second computer a specific request for access to a specific path. Furthermore, the controlling process includes establishing a connection between the second computer and the first computer using the reception of the specific request as a trigger.

Additionally, the controlling process includes receiving from an application, which is to be accessed by the second computer, a database access request of the application for access to a database.

In addition, the controlling process includes accessing the database according to the database access request, acquiring a database access result from the database, and transmitting to the second computer an execute instruction script for directing the second computer to perform the proxy process of transmitting the database access result to the first computer.

The controlling process further includes directing the second computer to perform the proxy process by transmitting the database access request to the second computer through the connection by including the request in the execute instruction script or separately from the execute instruction script. Additionally, the controlling process includes receiving the database access result from the second computer and outputting the database access result to the application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration of a system;
FIG. 2 is an example of a correspondence table and a setting file;
FIG. 7 is a flowchart of the operation of a script generation unit;
FIG. 8A is a sequence (1) relating to an operation example according to the first embodiment;
FIG. 14 is an example of a source code transmitted to a browser in the second embodiment;
FIG. 17 is another example of a setting file.

DESCRIPTION OF EMBODIMENTS

Figure 3:
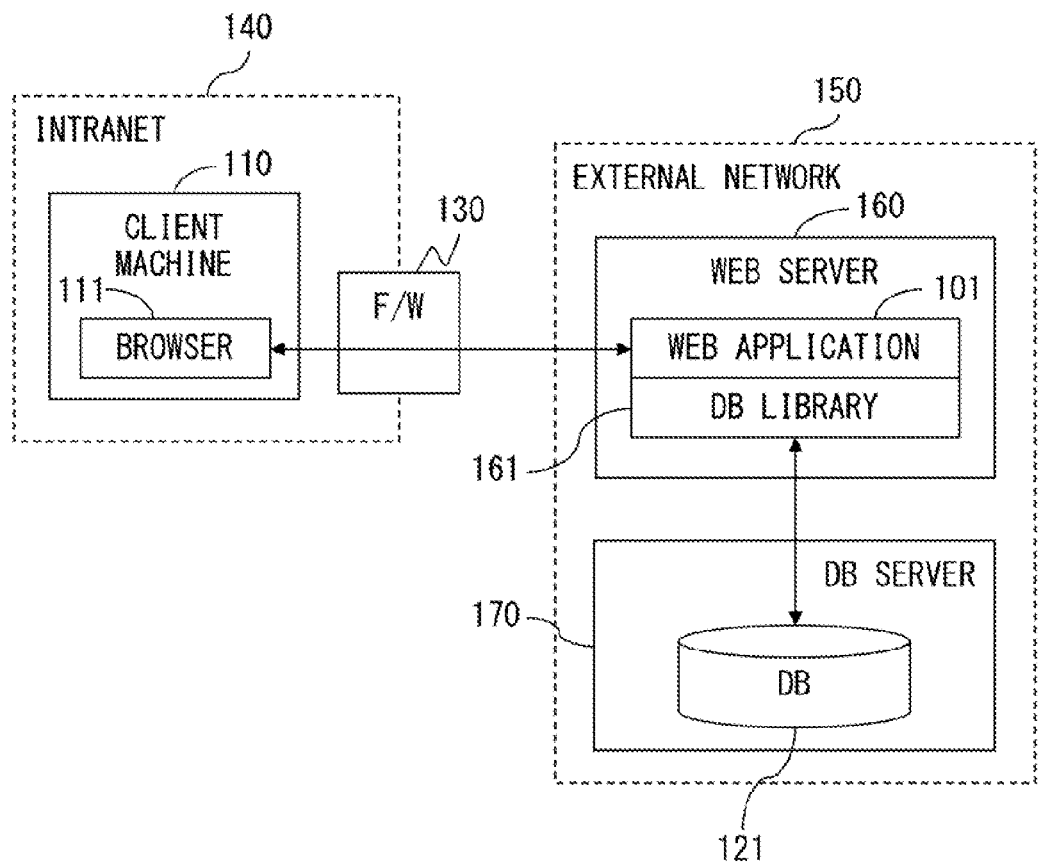
FIG. 3 is a configuration of the system of a comparison example.

The technology of the Web application operating in the server on the external network and performing the process using the data of a DB in an intranet is under development. That is, although the application such as a Web application loaded into the first computer arranged in the external network etc. has issued a request to access the DB, a browser of the second computer capable of operating in association with the Web application in the intranet loaded with the browser does not accommodate the process of accessing the DB, and the DB cannot be accessed according to the access request. These problems also occur not only in the case where an application on an external network issues a request to access a DB in an intranet, but also in the case where an application not permitted to access the DB issues a request to access the DB.

Preferred embodiments of the present invention will be explained with reference to accompanying drawings.

First, the common points between the first and second embodiments are described with reference to FIGS. 1 through 7. Next, the first embodiment in which the technology called "iframe streaming" or "Hypertext Transfer Protocol (HTTP) streaming" is used is described with reference to FIGS. 8A through 11. Then, the second embodiment in which the technology called "long polling" is used is described with reference to FIGS. 12 through 16. Afterwards, other variation examples are described with reference to FIGS. 17 through 19.

FIG. 1 is a configuration of the system common between the first and second embodiments. The system in FIG. 1 includes a Web server 100, a client machine 110, and a DB server 120. The Web server 100 is, in other words, an application server.

A firewall 130 protects an intranet 140 to which the client machine 110 and the DB server 120 belong against external illegal access. In the figure, the "firewall" is expressed as "F/W" due to space limitations.

In the descriptions below, the network separated from the intranet 140 by the firewall 130 is called an "external network 150". That is, for the client machine 110 and the DB server 120, the external network 150 is a network external to the intranet 140, and is a network on the Internet side.

Practically, the external network 150 can be, for example, another intranet connected to the intranet 140 through the Internet. The Web server 100 belongs to the external network 150.

For example, the intranet 140 can be an intranet of a corporation. In addition, the external network 150 can be software as a service (SaaS) vendor for providing a Web service or an intranet of an application service provider (ASP).

The Web server 100 is a server machine on which HTTP server software is installed, and performs a Web application 101. On the other hand, the client machine 110 performs a browser 111. The DB server 120 has a DB 121 storing various data used in the process performed by the Web application 101.

The Web server 100 includes a DB interface unit 102 and an allocation unit 103, and the allocation unit 103 includes a script generation unit 104. Then, the Web server 100 stores a correspondence table 105 and a setting file 106. Practical examples of the correspondence table 105 and the setting file 106 are described later with reference to FIG. 2.

The Web server 100 not only performs the Web application 101, but also operates as a control device on the server side for controlling the flow of the DB access. That is, the DB interface unit 102 and the allocation unit 103 (including the script generation unit 104) operate as at least a part of the control device using the correspondence table 105 and the setting file 106.

The DB interface unit 102 provides the Web application 101 with an interface for DB access. The allocation unit 103 performs the process according to the request from the browser 111 and the process according to the request from the DB interface unit 102 to relay the access from the Web application 101 to the DB 121. Since the practical operation of the allocation unit 103 depends on the embodiments, the details of the allocation unit 103 are described later with reference to FIGS. 8A through 16.

The page displayed by the browser 111 includes an inline frame 112 for display of the page of the Web application 101 and an inline frame 113 for maintenance of the Comet connection between the browser 111 and the Web server 100. In the following descriptions, the term "inline frame" is simply expressed as "iframe" using the tag name of the hypertext markup language (HTML) for a simple expression.

Practically, the iframe 113 loads a source code including a DB access proxy script 114. The DB access proxy script 114 is used by the Web server 100 to enable the client machine 110 to access the DB 121 by proxy. The DB access proxy script 114 is generated by the script generation unit 104, and transmitted from the allocation unit 103 to the browser 111.

The DB access proxy script 114 is written in a script language such as JavaScript (registered trademark) etc. The DB access proxy script 114 can be included in a <script> block, or dispersed to a plurality of <script> blocks in the source code loaded to the iframe 113.

As described above, the practical operation of the allocation unit 103 depends on the embodiment, but the outline of the operation of the allocation unit 103 is described below.

The allocation unit 103 accepts a request to access a specific path on the Web server 100 (hereafter referred to as a "specific request") from the client machine 110 (to be more practical, from the browser 111). Then, the allocation unit 103 establishes the connection between the client machine 110 (to be more practical, the browser 111 on the client machine 110) and the Web server 100 using the reception of the specific request as a trigger.

An established connection is practically an HTTP connection, and in more detail an HTTP connection on the transmission control protocol (TCP) connection. Since the established connection is used in realizing a pseudo server push, it is also called a "Comet connection" from the viewpoint of a use.

The specific path is a special path predetermined and reserved as a path not to be used by the Web application 101.

For example, assume that the Web application 101 is provided through the path under "http://www.foo.com/". Also assume that it is determined that a path beginning with an underscore in the directory of the document root of the Web server 100 is not used by the Web application 101.

Then, for example, the path "_reservedForComet" is available as the specific path. In this case, a specific request can be an HTTP request in which the uniform resource identifier (URI) "http://www.foo.com/_reservedForcomet" is specified as a request URI. That is, a specific request can be a request to loaded a page specified by a specific path to the iframe 113.

Otherwise, the DB access proxy script 114 loaded to the iframe 113 by the browser 111 can include the code for transmission of the HTTP request to the URI including a specific path using an XMLHttpRequest (XHR) object. In this case, the specific request is practically an HTTP request to the URI including a specific path using the XHR object. Naturally, the specific request can be realized by an asynchronous communication by the implementation other than the XHR object.

The details are described later, but any of the above-mentioned two types of specific requests can maintain the connection established by the allocation unit 103 using the reception of the specific request as a trigger between the browser 111 and the Web server 100 using the iframe 113. A pseudo server push can be realized through a maintained connection.

The connection maintained to realize the pseudo server push is also called a "Comet connection". "Comet" generally refers to a technique of realizing a pseudo server push.

The allocation unit 103 not only accepts a request from the browser 111, but also accepts a request from the DB interface unit 102.

Practically, the DB interface unit 102 accepts a request of the Web application 101 to access the DB 121 (hereafter referred to as a "DB access request") from the Web application 101. Then, the DB interface unit 102 outputs the accepted DB access request to the allocation unit 103. That is, the DB access request from the Web application 101 is relayed to the allocation unit 103 through the DB interface unit 102, and accepted by the allocation unit 103.

The allocation unit 103 transmits a script to enable the browser 111 of the client machine 110 to access by proxy the DB 121 at the DB access request accepted from the DB interface unit 102 as described above. The transmitted script is hereafter referred to as a "execute instruction script" for convenience.

The execute instruction script is practically at least a part of the DB access proxy script 114. The execute instruction script is generated by the script generation unit 104 at an instruction of the allocation unit 103, and transmitted from the allocation unit 103 to the browser 111.

Practically, the execute instruction script is to enable the client machine 110 (practically the browser 111) to perform the following process (also referred to as the "proxy process" for convenience of explanation). That is, the proxy process is to access the DB 121 at the above-mentioned DB access request, acquire a DB access result from the DB 121, and transmit the DB access result to the Web server 100.

The allocation unit 103 can enable the script generation unit 104 to generate an execute instruction script including a DB access request. Then, the allocation unit 103 can transmit the execute instruction script including the DB access request to the browser 111 through the connection maintained as described above. Otherwise, the allocation unit 103 can transmit the DB access request to the browser 111 separately from the execute instruction script through the connection maintained as described above.

Anyway, the DB access request is pushed in a false manner from the Web server 100 to the client machine 110 through the connection maintained. Then, the allocation unit 103 enables the client machine 110 (practically the browser 111) to perform the proxy process by transmitting the DB access request to the client machine 110 (practically the browser 111). That is, the browser 111 of the client machine 110 performs the proxy process using the reception of the DB access request from the allocation unit 103 as a trigger.

When the browser 111 performs the proxy process using the reception of the DB access request as a trigger, the DB access result is transmitted to the Web server 100. Then, the allocation unit 103 receives the DB access result.

The allocation unit 103 outputs the received DB access result to the DB interface unit 102. Then, the DB interface unit 102 outputs the DB access result acquired from the allocation unit 103 to the Web application 101. As a result, the Web application 101 can perform the process using the DB access result (for example, dynamically generating an HTML page).

As described above, the system illustrated in FIG. 1 requires no additional system such as an interface server, an intermediate system, a relay server, etc. Nevertheless, the system illustrated in FIG. 1 can enable the Web application 101 to perform the process using the DB 121 held in the intranet 140 separated from the Web server 100 by the firewall 130.

Therefore, the system illustrated in FIG. 1 enables a user to use the Web application 101 without considering the leakage of information by the storage of the DB 121 in the external network 150.

Thus, even in the environment in which access from a computer to a database is not permitted, the application on the computer can perform the process using a database access result.

Naturally, the Web application 101 temporarily stores a part of the data of the DB 121. For example, the Web application 101 may receive new data to be added to the DB 121 from the browser 111, and store the received data in memory. Otherwise, the Web application 101 may receive existing data of the DB 121 from the DB interface unit 102, and store the received data in the memory.

However, the Web application 101 does not permanently accumulate temporarily used data in the external network 150. That is, data is partially used in a volatile manner by the Web application 101, and the contents of the entire DB 121 are not stored in a non-volatile manner in the external network 150. Therefore, the risk of leaking the information from the external network 150 is very low, or there is almost no risk of leaking the information. Therefore, the system in FIG. 1 is appropriate when the data which a user likes to be secret is included in the DB 121.

FIG. 2 is an example of a correspondence table 105 and a setting file 106. The correspondence table 105 is used for management of a connection, and is dynamically rewritten. The setting file 106 is a static file in which the value to be embedded in the DB access proxy script 114 by the script generation unit 104 is preset.

A correspondence table 105a illustrated in FIG. 2 is a practical example of the correspondence table 105 illustrated in FIG. 1. The correspondence table 105a includes one or more entries. Each entry associates a session identification (ID) for identification of a session with a connection ID for identification of a Comet connection.

In the correspondence table 105a illustrated in FIG. 2, a session ID "$A_1$" is associated with a connection ID "$B_1$". Similarly, in the correspondence table 105a, a session ID "$A_2$" is associated with a connection ID "$B_2$", and a session ID "$A_3$" is associated with a connection ID "$B_3$".

A session ID is issued when the Web server 100 (to be more practical, the allocation unit 103) generates a new session. It is preferable that a session ID is a random value having a sufficient length.

A connection ID can be any type of information for identification of a Comet connection. For example, a connection ID can be an ID of a file descriptor, or a pointer to a handle. The format of the connection ID can depend on the operating system (OS) of the Web server 100.

The allocation unit 103 adds and deletes an entry to and from the correspondence table 105 according to the flowchart described later. The allocation unit 103 can further delete an entry including the session ID of the session on which a timeout has occurred when a session timeout occurs.

Furthermore, a setting file 106a illustrated in FIG. 2 is a practical example of the setting file 106 in FIG. 1. Another example of the setting file 106 is described later with reference to FIG. 17. The setting file 106a includes an item of "DB address" indicating the address for access from the browser 111 to the DB server 120.

As illustrated in FIG. 1, the client machine 110 which performs the browser 111 and the DB server 120 belong to the same intranet 140. Therefore, the browser 111 can access the DB server 120 using the private Internet protocol (IP) address of "192.168.123.45".

The DB server 120 accepts the access request from another computer in the intranet 140 to the DB 121 practically through the HTTP. Therefore, an URI including the private IP address in the intranet 140 of "http://192.168.123.45/" is set as a DB address in the setting file 106a.

Depending on the interface of the DB server 120, the address format of the DB server 120 set in the setting file 106 can be arbitrarily changed. For example, a URI can be used with a fully-qualified domain name (FQDN) instead of the private IP address. The URI of the DB server 120 can include a port number.

Next, to clarify the advantages of the system illustrated in FIG. 1, a comparison example is described below with reference to FIG. 3. FIG. 3 is a system configuration of a comparison example.

The client machine 110 illustrated in FIG. 3 performs the browser 111 as in FIG. 1. The client machine 110 belongs to the intranet 140 separated from the external network 150 by the firewall 130 as in FIG. 1.

In addition, in the comparison example in FIG. 3, the external network 150 includes a Web server 160 and a DB server 170. The Web server 160 is similar to the Web server 100 illustrated in FIG. 1 in that they perform the Web application 101. The DB server 170 holds the DB 121 similar to that held by the DB server 120 illustrated in FIG. 1. In FIG. 3, the reason why the DB server 170 and the Web server 160 are located in the same external network 150 is that the Web server 160 cannot access the computer in the intranet 140 over the firewall 130.

In the comparison example illustrated in FIG. 3, the Web application 101 accesses the DB 121 on the DB server 170 through the DB library 161. That is, the DB library 161 provides the Web application 101 with an application programming interface (API) for DB access.

The operation of the browser 111 and the Web application 101 in the above-mentioned comparison example of the system configuration illustrated in FIG. 3 is described below.

When the browser 111 requests a dynamic page using the data of the DB 121, or when it requests adding, deleting, or updating data on the DB 121, the Web application 101 accesses the DB 121 through the DB library 161. Then, the Web application 101 refers to, adds, deletes, or updates data through the DB library 161.

The Web application 101 dynamically generates an appropriate page and returns it to the browser 111 or returns a statically stored page to the browser 111 depending on the result of the access to the DB 121. Then, the browser 111 displays the page returned from the Web application 101 on the display.

Assume that the data stored in the DB 121 is the data to be secret at the request of a user (hereafter referred to also as "confidential information"). An example of the confidential information for a corporation user is confidential client information etc.

A user may consider "the confidential information is not to be held externally to the intranet 140". Furthermore, the user may worry "the confidential information may leak on the external network 150". As a result, the user may determine not to use the Web application 101.

That is, in the system of the comparison example illustrated in FIG. 3, the fact that "the DB 121 is stored externally to the intranet 140" works as the factor of interfering with the promotion of the use of the Web application 101. On the other hand, the DB 121 is located in the intranet 140. That is, in the embodiment in FIG. 1, as compared with the comparison example in FIG. 3, the factor of the user hesitating to use the Web application 101 which processes the confidential information is partly solved. Therefore, the embodiment in FIG. 1 is effective in promoting the use of the Web application 101.

Furthermore, the embodiment in FIG. 1 does not require any device in addition to the Web server 100, the client machine 110, and the DB server 120.

For example, when the comparison example in FIG. 3 is varied and the DB server 170 is moved from the external network 150 to the intranet 140, a type of "tunnel" mechanism is considered as a countermeasure.

Practically, a relay server can be provided for each of the intranet 140 and the external network 150. When the two relay servers maintain the connection between the relay servers which have passed the firewall 130, the access from the Web application 101 to the DB 121 in the intranet 140 can be realized.

On the other hand, the embodiment illustrated in FIG. 1 requires no additional devices such as the above-mentioned two relay servers. Requiring no additional devices has an effect of reducing the labor and cost for the implementation and operation of the Web application 101. That is, the embodiment illustrated in FIG. 1 not requiring additional devices excels in the viewpoint of serviceability and cost.

Furthermore, in the system requiring an additional device, there is the possibility that the additional device can be a single point of failure (SPoF) of the entire system. That is, although the Web server 160 and the client machine 110 are normally operated, there is the possibility that the Web application 101 is not available by the additional device getting faulty. Therefore, the embodiment in FIG. 1 which requires no additional devices excels also in the viewpoint of availability.

The embodiment in FIG. 1 also excels in security the system including the above-mentioned two relay servers because, in the system in FIG. 1, the connection established when a specific request is received is disconnected when the user terminates the browser 111.

On the other hand, in the system using two relay servers, there remains the connection between the two relay servers even after the termination of the browser 111. Then, under the condition on which the browser 111 is not practically using the Web application 101, the Web server 160 can access the DB 121 in the intranet 140 through the connection between the relay servers.

Then, permitting excess access is not preferable in security. For example, on rare occasions, there is the possibility that malware aside from the Web application 101 can be installed on the Web server 160. In this case, the malware can access the DB 121 in the intranet 140 through the connection between the two relay servers remaining after the termination of the browser 111.

Therefore, the embodiment in FIG. 1 in which the connection is disconnected after the termination of the browser 111 excels in security the system including the two relay servers.

Furthermore, the system in FIG. 1 also excels the above-mentioned system including the two relay servers in use efficiency of resources because, in the system using the two relay servers, there remains the connection between the two relay servers even after the termination of the browser 111, and as a result excess network resources and Web server resources are consumed.

The interface provided for the Web application 101 by the DB interface unit 102 illustrated in FIG. 1 can be the interface provided for the Web application 101 by the DB library 161 in FIG. 3. That is, the DB interface unit 102 can be implemented in the form of available library from the Web application 101.

In this case, although the source code of the Web application 101 used in the system in FIG. 3 is not changed, the system in FIG. 3 can be changed as in the system illustrated in FIG. 1. That is, the existing source code of the Web application 101 can be effectively used.

Figure 4:
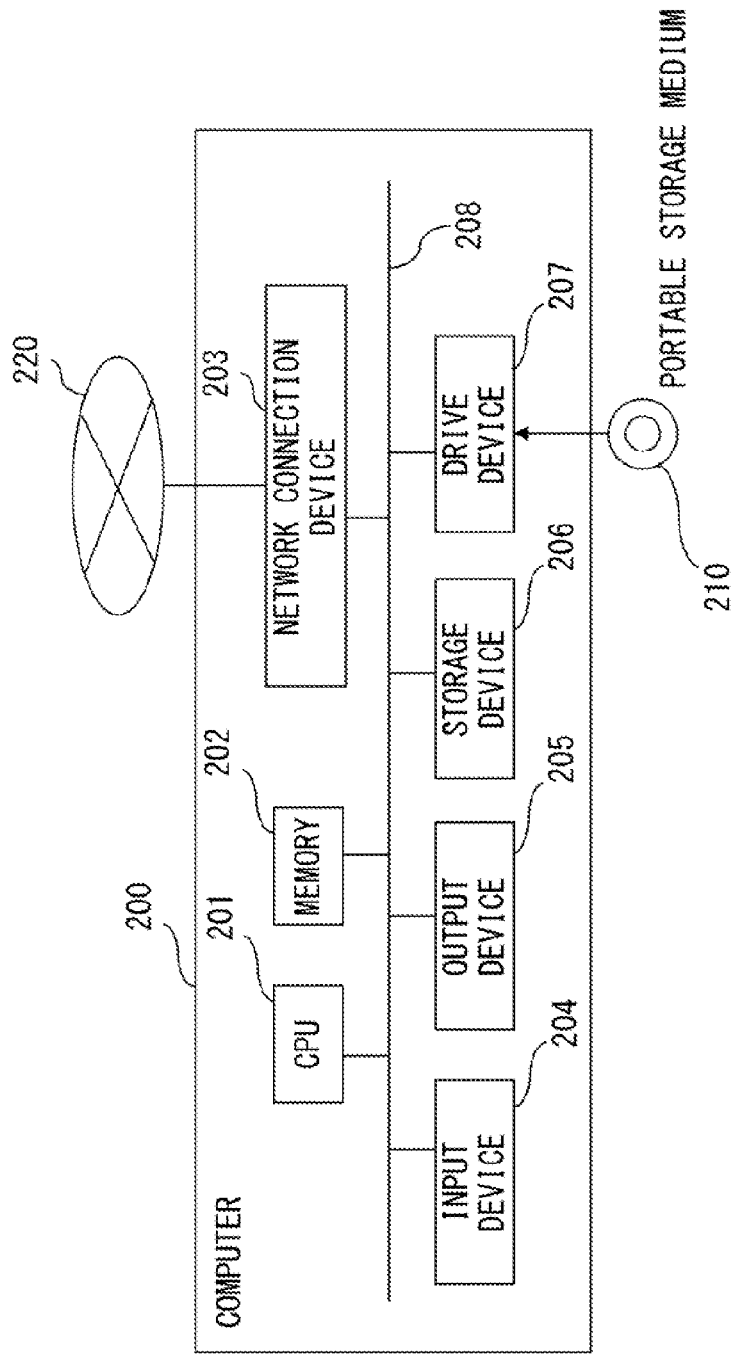
FIG. 4 is a configuration of the hardware of a computer.

The Web server 100, the client machine 110, and the DB server 120 in FIG. 1 can be a computer exemplified in, for example, FIG. 4. FIG. 4 is a hardware configuration of a computer.

A computer 200 in FIG. 4 includes a central processing unit (CPU) 201, memory 202, a network connection device 203, an input device 204, an output device 205, a storage device 206, and a drive device 207. Each unit in the computer 200 is interconnected to one another through a bus 208.

The CPU 201 loads a program into the memory 202, and executes the program using the memory 202 as a work area. The memory 202 is, for example, dynamic random access memory (DRAM).

The program can be stored in the 206 in advance. Otherwise, the program can be downloaded from the network 220 through the network connection device 203, and copied to the storage device 206.

Otherwise, the program can be stored in the portable storage medium 210 and provided, and can be read by the drive device 207. When the program is read from the portable storage medium 210 by the drive device 207, it can be loaded directly into the memory 202, or temporarily copied to the storage device 206, and then loaded from the storage device 206 into the memory 202. As a portable storage medium 210, an optical disk such as a compact disc (CD), a digital versatile disc (DVD), etc., a magneto optical disk, a magnetic disk, a non-volatile semiconductor memory card, etc. are available.

The network connection device 203 is a communication interface device for communication through a network 220. The network connection device 203 is, for example, a wired local area network (LAN) interface device, wireless LAN interface device, or a combination of them.

The input device 204 is, for example, a keyboard, a pointing device such as a mouse, a touch screen, etc., a microphone, or a combination of them. The output device 205 is, for example, a display, a speaker, or a combination of them. The display can be a touch screen.

The storage device 206 is a non-volatile storage, and can be, for example, semiconductor memory such as read only memory (ROM), flash memory, etc. a hard disk device, or a combination of them. The memory 202, the storage device 206, and the portable storage medium 210 are examples of computer readable storage media. These computer readable storage media are tangible storage media, and not transitory media such as a signal carrier wave.

When the Web server 100 in FIG. 1 is the computer 200 illustrated in FIG. 4, the Web application 101 is one of the programs executed by the CPU 201. The DB interface unit 102, the allocation unit 103, and the script generation unit 104 are realized by the CPU 201 executing a program.

The Web application 101 uses the communicating function using the network connection device 203. The communicating function of the allocation unit 103 is realized by the network connection device 203.

When the Web server 100 is the computer 200, the network 220 practically includes the external network 150 to which the Web server 100 belongs. Furthermore, the network 220 includes another network (for example, the Internet, the intranet 140, etc.) directly or indirectly connected to the external network 150.

The correspondence table 105 is stored in the memory 202, and a part of the correspondence table 105 can be stored in the storage device 206. The setting file 106 is stored in the non-volatile storage device 206.

When the client machine 110 in FIG. 1 is the computer 200 in FIG. 4, the browser 111 is one of the programs executed by the CPU 201. The DB access proxy script 114 executed on the browser 111 is also one of the programs executed by the CPU 201.

The contents loaded to the iframe 112 are displayed on the display (that is, the output device 205) by the rendering function of the browser 111. The contents loaded to the iframe 113 can also be displayed on the output device 205 similarly. However, as described later, the iframe 113 can be invisible. In this case, the contents loaded to the iframe 113 are not displayed on the output device 205.

The communicating function of the browser 111 is realized by the network connection device 203. The communications between the client machine 110 and the DB server 120 and between the client machine 110 and the Web server 100 performed according to the DB access proxy script 114 are also practically realized by the network connection device 203.

When the client machine 110 is the computer 200, the network 220 practically includes the intranet 140 to which the client machine 110 belongs. Furthermore, the network 220 also includes another network (for example, the Internet, the external network 150, etc.) directly or indirectly connected to the intranet 140.

When the DB server 120 illustrated in FIG. 1 is the computer 200 illustrated in FIG. 4, the DB 121 is stored in the storage device 206. Then, the communication between the DB server 120 and the client machine 110 is realized by the network connection device 203. When the DB server 120 is the computer 200, the network 220 practically includes at least the intranet 140 to which the DB server 120 belongs.

Figure 5:
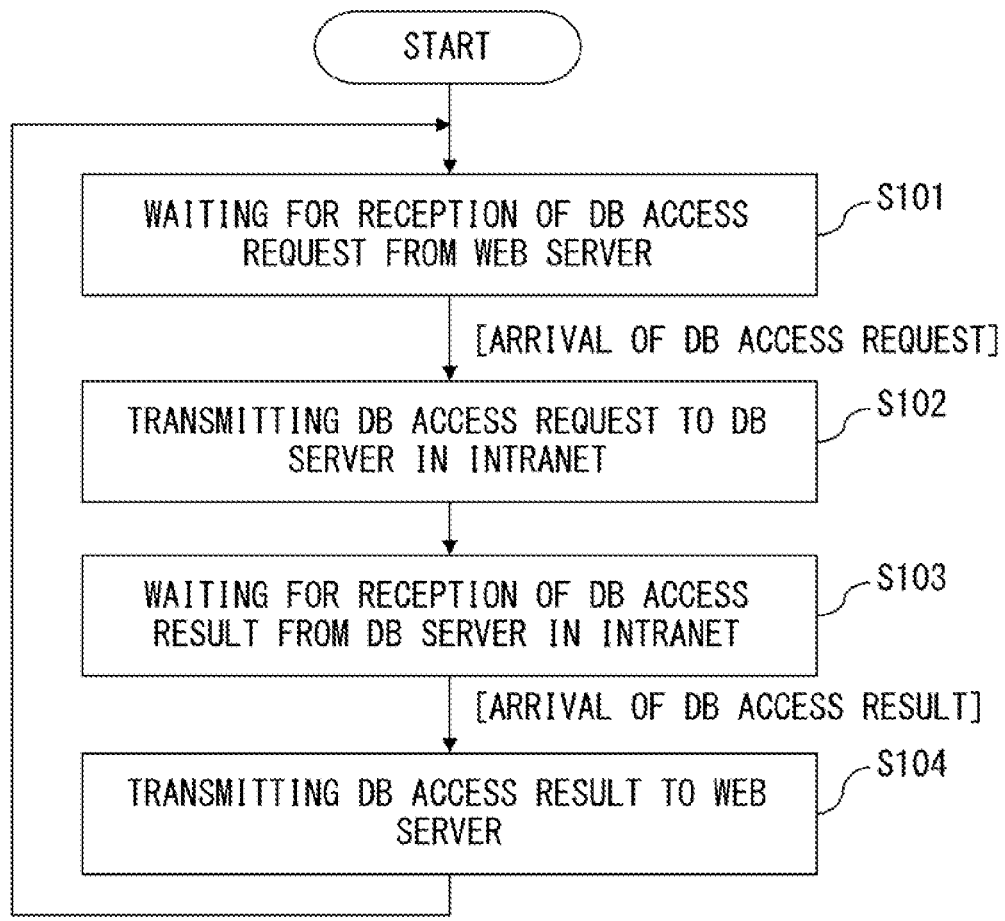
FIG. 5 is a flowchart of the process performed by a browser according to a DB access proxy script.

The proxy DB access by the browser 111 is described below with reference to FIG. 5. FIG. 5 is a flowchart of the process performed by the browser 111 according to the DB access proxy script 114.

In step S101, the browser 111 waits for the reception of the DB access request from the Web server 100. The DB access request can be practically transmitted from the allocation unit 103 of the Web server 100 in the form of a statement in the <script> block. Otherwise, the DB access request can be transmitted from the allocation unit 103 in the form of an HTTP reply in response to the HTTP request transmitted by the browser 111 using the XHR object.

When the browser 111 receives the DB access request from the allocation unit 103, control is passed to step S102. For convenience of reference, FIG. 5 also describes the guard condition of "arrival of DB access request". Other flowcharts also describe the guard condition for convenience of reference.

In step S102, the browser 111 transmits the DB access request to the DB server 120 in the intranet 140 according to the DB access proxy script 114.

For example, the DB server 120 can provide an interface for access from the client machine 110 in the intranet 140 to the DB 121 through the HTTP. In this case, the DB access proxy script 114 may include a code for enabling the browser 111 to perform the process of transmitting a DB access request to the DB server 120 through the HTTP using the XHR object.

The DB access proxy script 114 is generated by the Web server 100 of the external network 150. The domain of the external network 150 is different from that of the intranet 140.

Therefore, if a request of a cross domain is not accepted due to the same origin policy, the browser 111 is not permitted to transmit the request to the DB server 120 in the intranet 140 by executing the DB access proxy script 114. However, in the specification of the level 2 of the XHR, the request of the cross domain is permitted by the DB server 120. Therefore, by using the XHR of the level 2, the browser 111 can transmit the DB access request to the DB server 120 by executing the DB access proxy script 114.

After transmitting the DB access request in step S102, the browser 111 waits for the reception of the DB access result from the DB server 120 in the intranet 140 in step S103. When the browser 111 receives the DB access result from the DB server 120, control is passed to step S104.

For example, when the DB access request is to add, update, or delete data, the DB access result can be practically the control information about a "success" or an "error". On the other hand, when the DB access request is to refer to data, the DB access result is the requested data or the control information about an "error".

In addition, the practical data format of the DB access result is optional depending on the embodiment. The DB access result can be appropriately expressed by, for example, JavaScript Object Notation (JSON), Comma Separated Values (CSV), Extensible Markup Language (XML), etc.

In step S104, the browser 111 transmits the DB access result received from the DB server 120 to the Web server 100. The transmission in step S104 can also be realized by, for example, the XHR object. In addition, a practical destination URI of the DB access result is specified in the DB access proxy script 114.

After the transmission in step S104, control is returned to step S101. Therefore, although the Web application 101 issues a plurality of DB access requests to dynamically generate a page, the Web application 101 can acquire the DB access result corresponding to each DB access request. In addition, although a plurality of pages of the Web application 101 are sequentially invoked, the Web application 101 can obtain the DB access result in response to each DB access request of each page.

Next, the operation of the DB interface unit 102 is described with reference to the flowchart in FIG. 6.

In step S201, the DB interface unit 102 waits for the reception of the DB access request from the Web application 101. For example, when the DB 121 is a relational DB, the DB access request is expressed as a structured query language statement (SQL statement). Therefore, the DB interface unit 102 waits for the reception of the SQL statement from the Web application 101.

When the DB interface unit 102 receives the DB access request from the Web application 101, control is passed to step S202. In step S202, the DB interface unit 102 outputs the DB access request received from the Web application 101 to the allocation unit 103.

In the next step S203, the DB interface unit 102 waits for the reception of the DB access result from the allocation unit 103. When the DB interface unit 102 receives the DB access result from the allocation unit 103, control is passed to step S204.

In step S204, the DB interface unit 102 returns the DB access result received from the allocation unit 103 to the Web application 101. Then, control is returned to step S201.

As described above, the DB interface unit 102 repeats the processes in step S201 through S204, thereby the Web application 101 can acquire the DB access result in response to each DB access request although the Web application 101 issues a plurality of DB access requests.

The operation of the script generation unit 104 is described below with reference to the flowchart in FIG. 7.

First, in step S301, the script generation unit 104 reads the address of the DB server 120 from the setting file 106. Practically, the browser 111 on the client machine 110 in the same intranet 140 as the DB server 120 accesses the DB server 120. Therefore, the script generation unit 104 itself is prohibited without problems from accessing the address read in step S301.

After reading the address in step S301, control is passed to step S302. Then, the script generation unit 104 waits for the reception of the instruction to generate a script from the allocation unit 103 in step S302.

When the script generation unit 104 receives the instruction to generate a script from the allocation unit 103, control is passed to step S303. In step S303, the script generation unit 104 appropriately generates a script at the generate instruction. The script generated in step S303 is all or a part of the DB access proxy script 114.

In addition, depending on the contents of the generate instruction, the DB access proxy script 114 may embed the address of the DB server 120 read in step S301 in the script in step S303. On the other hand, depending on the contents of the generate instruction, the script generation unit 104 may not use the address of the DB server 120 in step S303.

In the next step S304, the script generation unit 104 returns the script generated in step S303 to the allocation unit 103. Afterwards, control is returned to step S302.

The common points between the first and second embodiments are described above with reference to FIGS. 1 through 7. Described below are the details of each of the first and second embodiments.

In the first embodiment, the technology called the "iframe streaming" or the "HTTP streaming" is used to maintain the Comet connection. Practically, the data in chunked form is loaded to the iframe 113.

That is, in response to the HTTP request from the browser 111 to loaded a page to the iframe 113, the allocation unit 103 specifies "chunked" in the transfer-encoding header field, and returns the HTTP reply. The message body of the HTTP reply in chunked form is transmitted after breaking the message into any number of chunks. Since the message body is not completed until the chunk size is specified as zero, the connection is maintained.

In the first embodiment, the allocation unit 103 transmits the DB access request to the browser 111 on the Comet connection (that is, the HTTP connection) maintained as described above. The first embodiment is described below more practically.

Figure 8B:
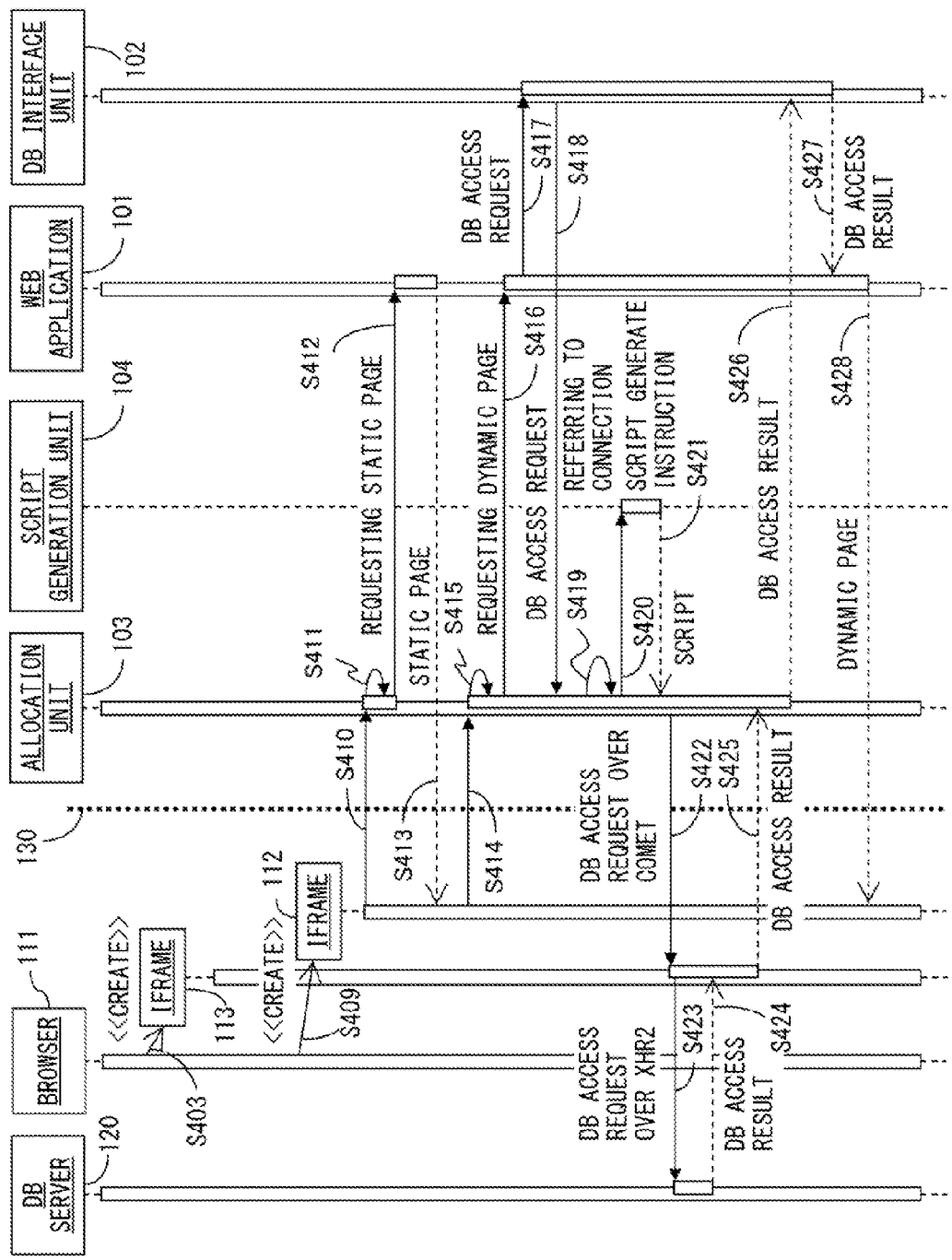
FIG. 8B is a sequence (2) relating to an operation example according to the first embodiment.
Figure 9:
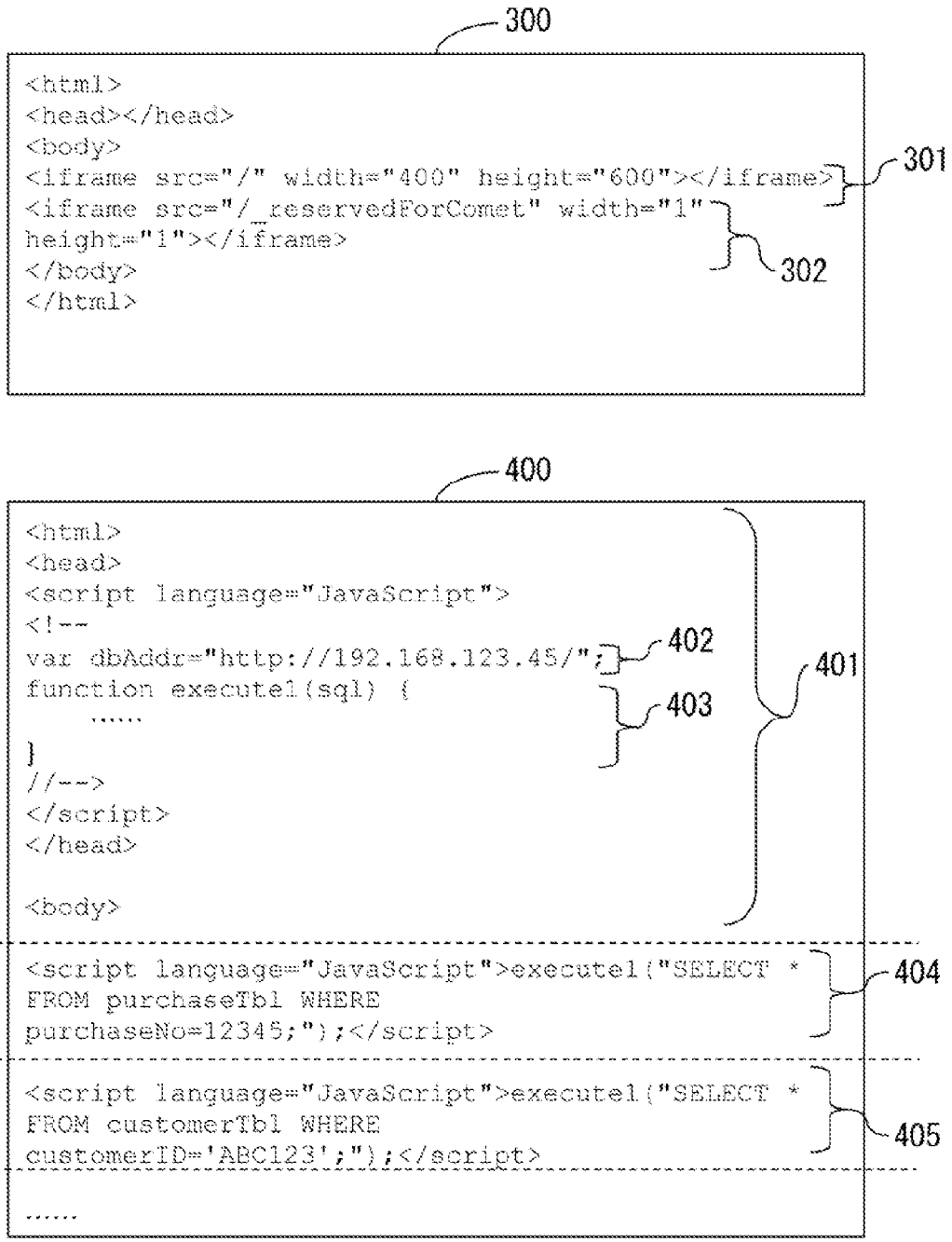
FIG. 9 is an example of a source code transmitted to a browser in the first embodiment.

FIGS. 8A and 8B illustrate the sequence of an operation example of the first embodiment expressed in the unified modeling language (UML). FIG. 9 is an example of a source code transmitted to the browser 111 according to the first embodiment.

In step S401 in FIG. 8A, the browser 111 transmits the first request to the Web server 100.

In the description below, it is assumed for convenience of explanation that the URI of the top page of the Web application 101 is "http://www.foo.com/". The user operates the input device of the client machine 110 to access the URI of "http://www.foo.com/" so that the Web application 101 can be used. In this example, the request transmitted from the browser 111 in step S401 is an HTTP request in which the "http://www.foo.com/" is specified as the URI.

In the Web server 100, the allocation unit 103 receives the request in step S401. Then, in step S402, the allocation unit 103 generates a new session, and returns a page in which the iframe 112 and the iframe 113 are specified as elements.

In the descriptions below, the page including the iframe 112 and the iframe 113 as elements is also called a "parent page" for convenience of explanation. The page loaded to the iframe 112 and the iframe 113 is called a "child page".

FIG. 9 is a practical example of the source code of the parent page and the child page. The parent page returned in step S402 above is, for example, a parent page 300 in FIG. 9. The parent page 300 includes an <iframe> block 301 and an <iframe> block 302.

The <iframe> block 301 in FIG. 9 is an example of an HTTP source code for enabling the browser 111 to display the page of the Web application 101 in the iframe 112. In addition, the <iframe> block 301 indicates that the width and the height of the iframe 112 are 400 pixels and 600 pixels respectively, and the relative URI of the source to be loaded to the iframe 112 is "/".

On the other hand, the <iframe> block 302 is an HTML source code for specification of the "specific path" described with reference to FIG. 1 as the source of the iframe 113. That is, the <iframe> block 302 is an HTML source code for enabling the browser 111 to issue the "specific request" described with reference to FIG. 1.

In the example in FIG. 9, in the <iframe> block 302, the value of the "src" attribute is specified as "/_reservedForComet" in relative path form. Therefore, assuming that the URI of the top page of the Web application 101 is "http://www.foo.com", the URI for access to the specific path is "http://www.foo.com/_reservedForComet".

In addition, the <iframe> block 302 indicates that the width and the height of the iframe 113 are 1 pixel each. Therefore, the user of the browser 111 cannot visually recognize the existence of the iframe 113 on the screen of the browser 111. The user will recognize that only the page of the Web application 101 is displayed on the browser 111.

Thus, by setting the iframe 113 as substantially invisible, the DB 121 in the intranet 140 can be used without degrading user convenience. That is, setting the iframe 113 as substantially invisible realizes a user-transparent service in which a user can be unaware the data of which DB is used by the Web application 101.

To set the iframe 113 as substantially invisible, the width and the height can be set to a very small value (for example, 1 pixel etc.) as exemplified in the <iframe> block 302, and the value of the "type" attribute can be specified as "hidden".

In FIG. 8A, after the browser 111 receives the parent page 300 in step S402, it recognizes from the source code of the parent page 300 that the parent page 300 includes two iframe blocks.

After the browser 111 loads the HTML source code of, for example, the parent page 300 in FIG. 9, it loads pages to the iframe 112 and the iframe 113 in an optional order, not in a specified order. However, in this example, it is assumed for convenience of explanation that a page is loaded first to the iframe 113.

FIG. 9 exemplifies a simple HTML source code such as the parent page 300 for convenience of explanation, the order in which a page is loaded to the iframe 112 and the iframe 113 can be controlled using a more complicated code. Therefore, although there is the assumption above that a load to the iframe 113 occurs first, the first embodiment is not limited to this assumption.

For example, the <iframe> block 301 can be varied to specify the URI of a dummy page for control as the source of the iframe 112. Then, the dummy page can include the script using the "on Load" attribute for redirection from the dummy page in the iframe 112 to "http://www.foo.com/" when the load to the iframe 113 is completed. Then, the assumption above holds.

Furthermore, the <iframe> block varied as described above to specify the URI of the dummy page as the source of the iframe 112 is similar to the simple <iframe> block 301 illustrated in FIG. 9 in the following point. That is, these <iframe> blocks are similar in that they are the codes for finally enabling the browser 111 to display the page of the Web application 101 in the iframe 112.

In any case, in step S403 in FIG. 8A, the iframe 113 is generated. Then, in step S404, the browser 111 transmits to the Web server 100 the HTTP request to the URI specified by the <iframe> block 302. That is, the browser 111 requests in step S404 for a page for maintenance of the Comet connection. The HTTP request in step S404 is a practical example of the "specific request" above.

The allocation unit 103 establishes a connection between the browser 111 and the Web server 100 when the specific request is received. Then, in step S405, the allocation unit 103 associates the session generated in step S402 with the established connection. Practically, the allocation unit 103 adds to the correspondence table 105 an entry for association of the session ID of the session generated in step S402 with the connection ID for identification of the connection established when the request is received in step S404.

Next, in step S406, the allocation unit 103 instructs the script generation unit 104 to generate a script. Then, the script generation unit 104 generates the script, and outputs the generated script to the allocation unit 103 in step S407.

In step S408, the allocation unit 103 returns to the browser 111 the page including the script acquired from the script generation unit 104. As described above, the message body of the HTTP reply in step S408 is prepared in chunked form. Therefore, after the transmission in step S408, the connection is maintained.

Refer to FIG. 9 again, and an example of the child page loaded to the iframe 113 is described.

A child page 400 in FIG. 9 includes a chunk 401 returned in step S408. In the example in FIG. 9, the chunk 401 includes a start tag of an <html> element, a <head> element, and a start tag of a <body> element. Then, the <head> element includes a <script> block, and the <script> block includes an address assign statement 402 and a function definition 403. The script generated by the script generation unit 104 according to the generate instruction in step S406 is, for example, practically the <script> block in the chunk 401.

In addition, the address assign statement 402 is a statement for practically assigning the address of the DB server 120 set in the setting file 106a to a variable dbAddr. Then, the function definition 403 is the definition of a function execute1 for enabling the browser 111 to perform the "proxy process" described above with reference to FIG. 1.

In FIG. 9, the address assign statement 402 is external to the function definition 403 of the proxy process, and the variable dbAddr is defined as a global variable. However, the variable dbAddr can be defined as a local variable of the function execute1 in the function definition 403.

In the description below, it is assumed that the DB 121 is a relational DB for convenience of explanation. Therefore, the DB access request is expressed by an SQL statement. Therefore, the function execute1 uses the SQL statement indicating the DB access request as an argument sql.

As understood from the example in FIG. 9, when the browser 111 loads the chunk 401 of the child page 400 to the iframe 113 in step S408 in FIG. 8A, no side effects occur. That is, the browser 111 does not access the DB server 120 in this step.

In the next step S409, the iframe 112 is generated. Then, in step S410, a load of a page to the iframe 112 occurs. That is, the browser 111 transmits to the Web server 100 the HTTP request to the URI specified by the <iframe> block 301 in FIG. 9.

The examples in FIGS. 8A and 8B are examples of the case in which the top page of the Web application 101 is a static page. Therefore, the request in step S410 is a request of a static page.

In step S411, after the allocation unit 103 receives the request from the browser 111, it determines that the received request is a request to access a static page of the Web application 101. Then, the allocation unit 103 outputs the received request to the Web application 101 in step S412. That is, the allocation unit 103 commits the process in response to the request from the browser 111 to the Web application 101.

Then, in step S413, the Web application 101 returns the requested static page to the browser 111. Then, the browser 111 displays the returned static page in the iframe 112.

Furthermore, the static page displayed as described above can include the link to the page dynamically generated by the Web application 101 using the data of the DB 121. Otherwise, the static page can include an input form for next display of the dynamic page.

The example in FIG. 9 is an example when the next dynamic page is requested by the user performing any operation (for example, a link click, input to an input form, etc.) on the displayed static page.

Practically, with the operation of the user, the browser 111 transmits to the Web server 100 the HTTP request to the dynamic page to be loaded to the iframe 112 in step S414.

Then, in step S415, after the allocation unit 103 receives the request from the browser 111, it determines that the received request is a request to access the dynamic page of the Web application 101. Then, the allocation unit 103 outputs the received request to the Web application 101 in step S416. That is, the allocation unit 103 commits the process in response to the request from the browser 111 to the Web application 101.

Then, the Web application 101 performs the process of generating a requested dynamic page. Practically, the Web application 101 outputs the DB access request to the DB interface unit 102 in step S417 to acquire the data for use in generating a page from the DB 121.

Then, in step S418, the DB interface unit 102 outputs to the allocation unit 103 the DB access request received from the Web application 101.

Then, in step S419, the allocation unit 103 inquires about the connection corresponding to the DB access request received from the DB interface unit 102. The details of step S419 are described later with reference to FIG. 10, but the allocation unit 103 can specify the Comet connection corresponding to the DB access request in step S418 by referring to the correspondence table 105. In the examples in FIGS. 8A and 8B, the Comet connection continuously maintained by the HTTP reply in chunked form in step S408 is designated in step S419.

In step S420, the allocation unit 103 instructs the script generation unit 104 to generate a script depending on the DB access request received in step S418. Then, the script generation unit 104 generates a script including the DB access request at the instruction. The script generation unit 104 then returns the generated script to the allocation unit 103 in step S421.

The allocation unit 103 transmits the script including the DB access request to the browser 111 on the Comet connection designated in step S419 in the next step S422.

As described above, the page to be loaded to the iframe 113 is transmitted in chunked form. After the first chunk is transmitted in step S408, the HTTP reply has not been completed. Therefore, the connection is maintained. Accordingly, in step S422, the next chunk is transmitted on the maintained connection. Then, in the transmitted chunk, the DB access request is embedded.

When FIG. 9 is referenced again, the chunk transmitted in step S422 is, for example, a <script> block 404 practically in the child page 400. The <script> block 404 is practically generated by the script generation unit 104 according to the instruction in step S420, transmitted in step S422, and loaded to the iframe 113.

The <script> block 404 in FIG. 9 includes an invoke statement of the function execute1 defined in the chunk 401 transmitted in step S408. Then, in the <script> block 404, the SQL statement of "SELECT * FROM purchaseTb1 WHERE purchaseNo=12345;" is specified as an argument of the function execute1.

The DB access request transmitted in step S422 in FIG. 8B is practically expressed by the SQL statement provided as an argument of the function invoke statement as described above. The function invoke statement of the <script> block 404 is executed by the browser 111 upon load to the iframe 113. That is, the <script> block 404 is a practical example of the "execute instruction script including the DB access request" described with reference to FIG. 1.

Then, the browser 111 transmits the DB access request to the DB server 120 according to the definition of the function execute1 in step S423. Practically, the browser 111 newly generates the XHR object at the level 2 (simply expressed as an "XHR2" for simplicity in FIG. 8B), and transmits the DB access request to the DB server 120 using the generated XHR object.

The HTTP request from the browser 111 to the DB server 120 using the XHR object can be realized by the GET method or the POST method depending on the interface of the DB server 120. When the GET method is used, the URI including the SQL indicating the DB access request as a query string is provided as an argument of the open method for the XHR object. When the POST method is used, the SQL statement indicating the DB access request is provided as an argument of the send method for the XHR object.

Anyway, upon receipt of the DB access request, the DB server 120 accesses the DB 121 at the DB access request.

For example, the DB access request when the <script> block 404 in FIG. 9 is transmitted in step S422 is a reference request for the table named "purchaseTb1" in the DB 121 practically. Therefore, in this case, the DB server 120 extracts the requested data from the DB 121.

Then, in step S424, the DB server 120 returns to the browser 111 the DB access result depending on the DB access request as the HTTP reply in response to the HTTP request by the XHR object.

Then, upon receipt of the DB access result, the browser 111 transmits the DB access result to the Web server 100 in step S425. The transmission of the DB access result in step S425 can be realized by a series of steps such as the following (A1) through (A3). That is, the function definition 403 can include the definition of the steps (A1) through (A3).

(A1) is a step of generating a new XHR object.
(A2) is a step of specifying the POST method of the HTTP as an argument, and applying the open method in which the URI including the specific path of the Web server 100 is specified as an argument to the new XHR object generated in the step (A1).

(A3) is a step of applying the send method in which the DB access result formatted in an appropriate form such as the JSON, the CSV, the XML, etc. is specified as an argument to the new XHR object generated by the step (A1).

Upon receipt of the DB access result transmitted in step S425 as described above, the allocation unit 103 outputs the received DB access result to the DB interface unit 102 in the next step S426.

Then, in step S427, the DB interface unit 102 outputs the DB access result acquired from the allocation unit 103 to the Web application 101. Then, in step S428, the Web application 101 dynamically generates a page using the DB access result acquired from the DB interface unit 102, and returns the generated dynamic page to the browser 111 as an HTTP reply in response to the HTTP request in step S414. Then, the browser 111 displays the dynamic page in the iframe 112.

The examples in FIGS. 8A and 8B are examples in various operation examples. For example, after the dynamic page is returned to the browser 111 in step S428, another dynamic page can be requested again. When a plurality of dynamic pages are sequentially requested, a series of processes in steps S414 through S428 are repeated, and the screen in the iframe 112 is changed. For example, a <script> block 405 in FIG. 9 can be transmitted to the browser 111 as in step S422 at the request of the second dynamic page, and loaded to the iframe 113.

Otherwise, the generation of one page can be accompanied with a plurality of DB access requests. In this case, after a series of processes as in steps S414 through S416 are performed once, a series of processes in steps S417 through S427 are repeatedly performed for the number of DB access requests. Afterwards, as in step S428, the Web application 101 returns the page to the browser 111.

The top page of the Web application 101 is not necessarily a static page. Although the top page is a dynamic page, no problems occur if the chunk 401 is loaded in step S408 to the iframe 113 before loading a page to the iframe 112. Then, as described above, appropriately amending the <iframe> block 301 and using a dummy page guarantee the first load of the chunk 401 in step S408 to the iframe 113.

For convenience of explanation, FIGS. 8A through 9 exemplify the reference request to the DB 121 (that is, the request expressed by the SELECT statement) as a practical example of the DB access request. However, the DB access request can be a request to add data to the DB 121, update existing data in the DB 121, or delete data from the DB 121. In addition, depending on the type of the DB access request, the method of the HTTP request transmitted by the browser 111 to the Web server 100 in step S414 depending on the type of DB access request is not limited to the GET method. Regardless of the type of DB access request, the DB access is performed by proxy by the browser 111 as in steps S414 through S428.

The processes described above with reference to FIGS. 5 through 7 are explained in detail as follows with reference to FIGS. 8A through 9.

As illustrated in FIG. 5, the browser 111 operates according to the DB access proxy script 114 loaded to the iframe 113. The DB access proxy script 114 practically includes the address assign statement 402, the function definition 403 of proxy process, the <script> block 404, and the <script> block 405 in the example in FIG. 9.

The browser 111 waits for the reception of the DB access request from the Web server 100 as in step S101 in FIG. 5. In the examples in FIGS. 8A and 8B, the browser 111 waits for the reception of the DB access request in step S422 after loading the chunk 401 to the iframe 113 in step S408.

Step S102 in FIG. 5 corresponds to step S423 in FIG. 8B. As indicated in step S103 in FIG. 5, the browser 111 waits for the reception of the DB access result from the DB server 120. In the example in FIG. 8B, the browser 111 waits for the reception of the DB access result in step S424.

Then, step S104 in FIG. 5 corresponds to step S425 in FIG. 8B. In FIG. 5, control is returned from step S104 to step S101. By the loop illustrated in FIG. 5, each DB access is performed by proxy by the browser 111 when a plurality of dynamic pages are requested or when one page is accompanied with a plurality of DB access requests.

As clearly described above, the function definition 403 in FIG. 9 defines the operations in steps S102 through S104. In the defined function execute1, the address of the DB server 120 set in the variable dbAddr is referenced by the address assign statement 402 for the process in step S102 in FIG. 5. Then, step S101 in FIG. 5 practically corresponds to the reception of a chunk including the function invoke statement such as the <script> block 404 or 405.

Figure 6:
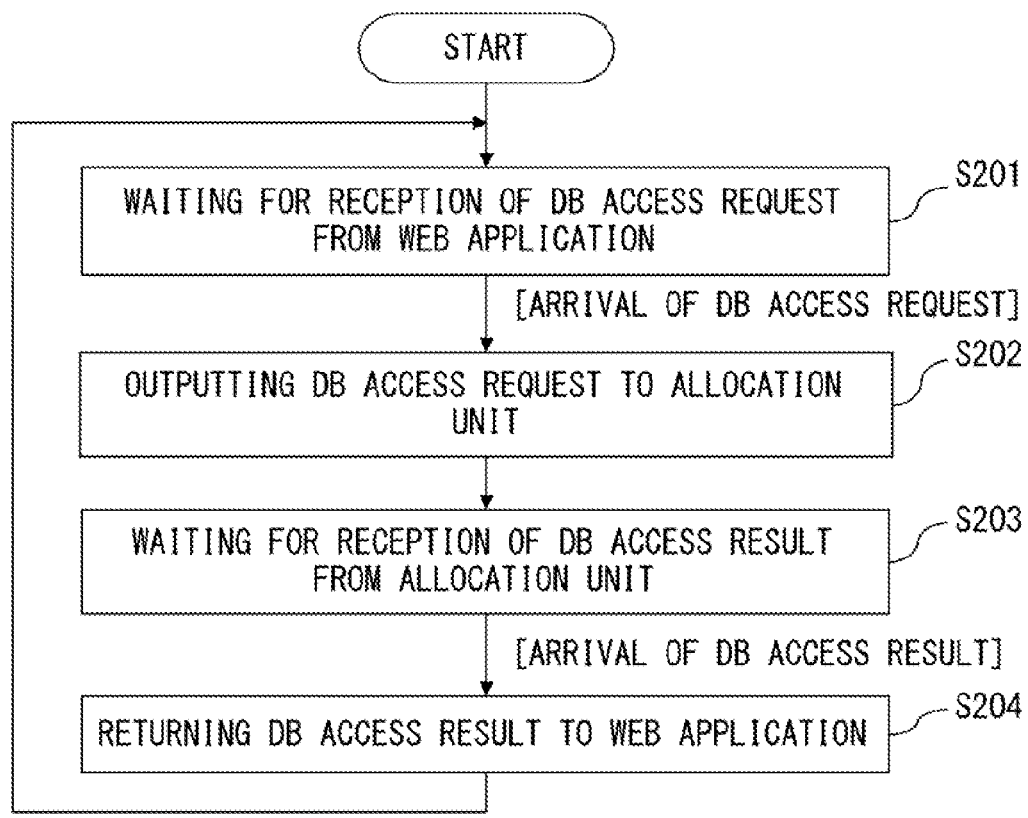
FIG. 6 is a flowchart of the operation of a DB interface unit.

In addition, as indicated in step S201 in FIG. 6, the DB interface unit 102 waits for the reception of the DB access request from the Web application 101. In the example in FIG. 8B, the DB interface unit 102 waits for the process in step S417.

Step S202 in FIG. 6 corresponds to step S418 in FIG. 8B. In addition, as indicated in step S203 in FIG. 6, the DB interface unit 102 waits for the reception of the DB access result from the allocation unit 103. In the example in FIG. 8B, the DB interface unit 102 waits for the process in step S426.

Step S204 in FIG. 6 corresponds to step S427 in FIG. 8B. In FIG. 6, control is returned from step S204 to step S201. By the loop illustrated in FIG. 6, each DB access is performed by proxy by the browser 111 through the DB interface unit 102 and the allocation unit 103 when a plurality of dynamic pages are requested or one page is accompanied with a plurality of DB access requests.

Step S301 in FIG. 7 is not clarified in FIGS. 8A and 8B. The script generation unit 104 waits for the reception of the script generate instruction from the allocation unit 103 in step S302 after performing the process in step S301. In the example in FIG. 8A, the script generation unit 104 wait for step S406.

The contents of the script generated by the script generation unit 104 in step S303 in FIG. 7 depend on the generate instruction. For example, when the generate instruction in step S406 in FIG. 8A is received, the script generation unit 104 generates the address assign statement 402 based on the address of the DB server 120 read in step S301, and generates also the function definition 403.

Step S407 in FIG. 8A corresponds to step S304 in FIG. 7. As illustrated in FIG. 7, control is returned from step S304 to step S302. As illustrated in FIG. 8B, the script generation unit 104 waits for the reception of the next script generate instruction from the allocation unit 103 in step S420.

The generate instruction in step S420 is practically a function invoke statement generate instruction, and specify the SQL statement for a DB access request as an argument of the function. Therefore, the script generated by the script generation unit 104 in step S303 in FIG. 7 is practically the <script> block 404 in FIG. 9. The next step S304 corresponds to step S421 in FIG. 8B.

The process in FIG. 7 returns control from step S304 to step S302. Therefore, by the loop in FIG. 7, the <script> block corresponding to each DB access request is generated by the script generation unit 104 when a plurality of dynamic pages are requested or one page is accompanied with a plurality of DB access requests. By the loop in FIG. 7, each script corresponding to the requests from a plurality of browsers is generated by the script generation unit 104.

The operation of the allocation unit 103 according to the first embodiment is described below in detail with reference to FIGS. 10 and 11.

Figure 10:
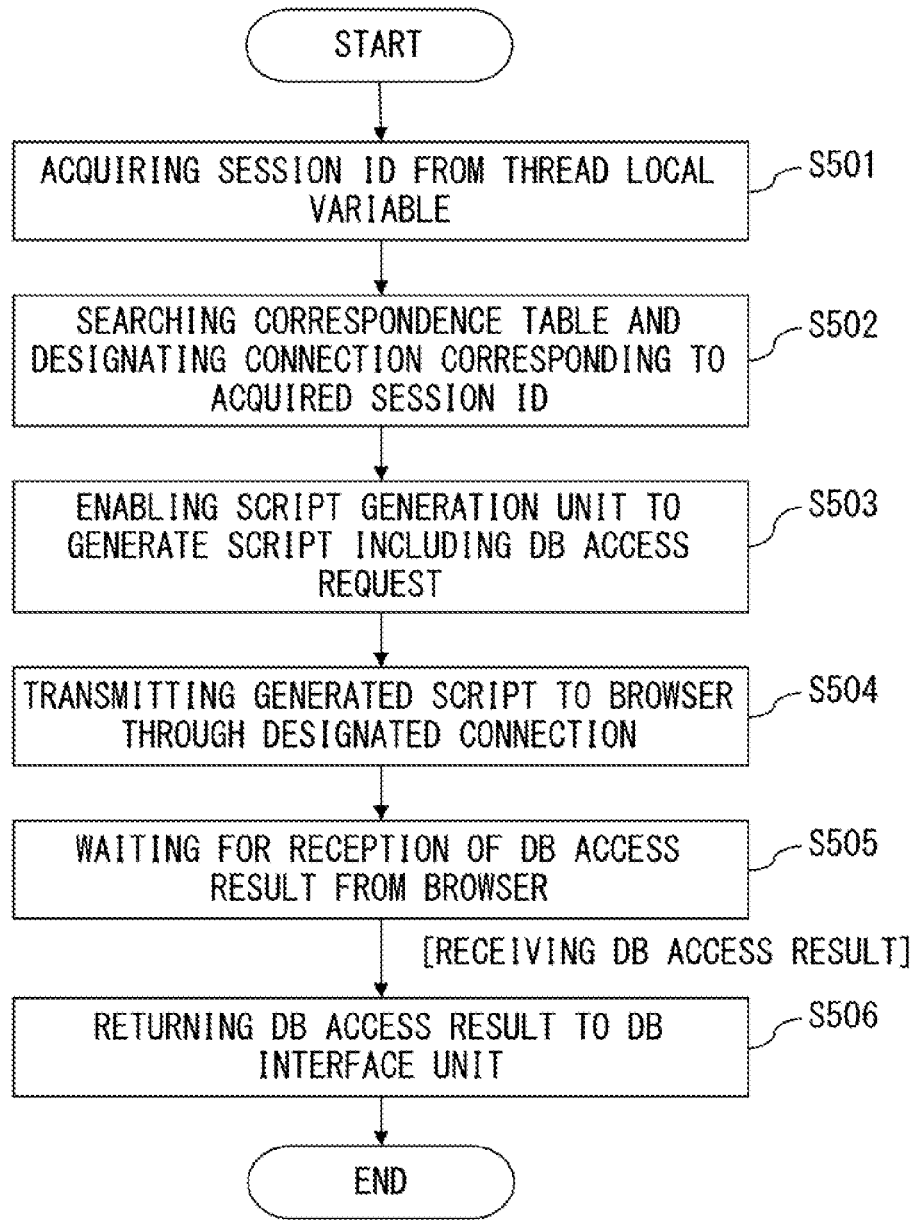
FIG. 10 is a flowchart of the process performed by the allocation unit using the reception of a DB access request from the DB interface unit as a trigger in the first embodiment.

FIG. 10 is a flowchart of the process performed by the allocation unit 103 using the reception of the DB access request from the DB interface unit 102 as a trigger in the first embodiment. For example, upon receipt of the DB access request in step S418 in FIG. 8B, the allocation unit 103 starts the process in FIG. 10.

In step S501, the allocation unit 103 acquires a session ID from a thread local variable. The details are described below with reference to FIG. 11, but the allocation unit 103 assigns the session ID to the thread local variable when it commits the access request (to be practical, the HTTP request) from the browser 111 to the Web application 101. The allocation unit 103 receives the DB access request from the DB interface unit 102 after the commission of the process to the Web application 101 occurs. Therefore, the allocation unit 103 can acquire the session ID from the thread local variable in step S501.

In the next step S502, the allocation unit 103 searches the correspondence table 105 using the acquired session ID as a search key and designates the connection corresponding to the acquired session ID. The example in step S502 is step S419 in FIG. 8B.

In the next step S503, the allocation unit 103 enables the 104 to generate the script including the DB access request used as a trigger for starting the process in FIG. 10. The example in step S503 is expressed in steps S420 and S421 in FIG. 8B.

For example, assume that the DB access request received by the allocation unit 103 in step S418 in FIG. 8B is expressed by the SQL statement provided as an argument of the function in the <script> block 404 in FIG. 9. In this case, in step S503, the allocation unit 103 specifies the SQL statement for the script generation unit 104, and enables the script generation unit 104 to generate the <script> block 404.

Since the process in step S503 is independent of the processes in steps S501 and F502, the process in step S503 can be performed in parallel to the processes in steps S501 and S502. Otherwise, the process in step S503 can be performed prior to the processes in steps S501 and S502.

In step S504 after the execution of the processes in steps S501 through S503, the allocation unit 103 transmits the script generated in step S503 to the browser 111 through the connection designated in step S502. The example in step S504 is step S422 in FIG. 8B. The <script> block 404 in FIG. 9 is an example of a script transmitted in step S504, and the <script> block 405 is another example of a script transmitted in step S504.

After the transmission of the script, the allocation unit 103 waits for the reception of the DB access result from the browser 111 in step S505. An example of step S505 is waiting for the reception in step S425 after the transmission in step S422 in FIG. 8B.

When the allocation unit 103 receives a DB access result from the browser 111, control is passed to step S506. Then, the allocation unit 103 returns the DB access result received from the browser 111 to the DB interface unit 102 in step S506. A practical example of step S506 is step S426 in FIG. 8B.

After the execution in step S506, the process in FIG. 10 terminates. When the browser 111 notifies the allocation unit 103 of the DB access result using the XHR, the allocation unit 103 can further return the HTTP reply in response to the HTTP request using the XHR to the browser 111. For example, the allocation unit 103 can return the HTTP reply having the status code of 200 (OK) and an empty message body to the browser 111.

Figure 11:
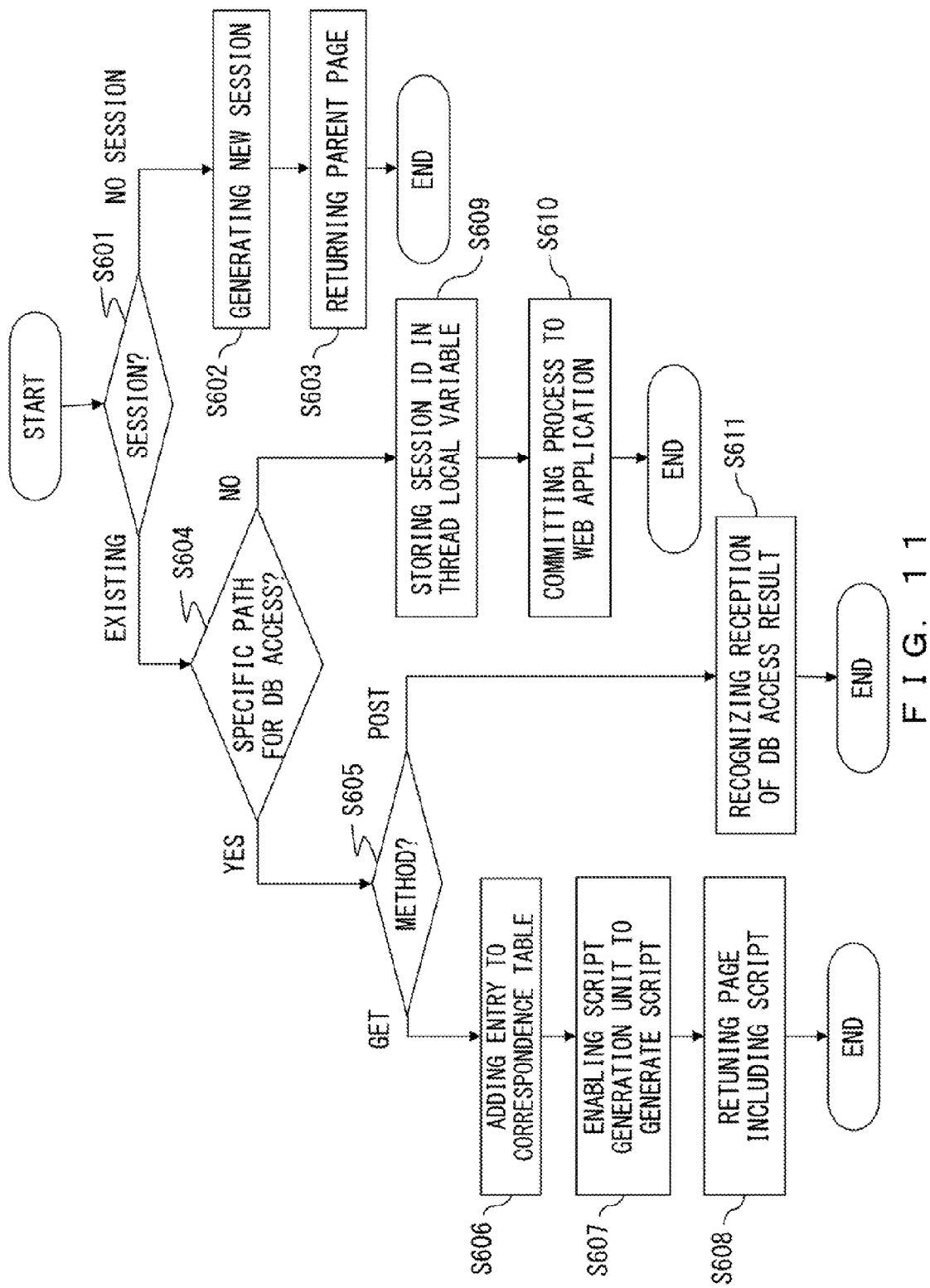
FIG. 11 is a flowchart of the process performed by the allocation unit using the reception of a request from a browser as a trigger in the first embodiment.

FIG. 11 is a flowchart of the process performed by the allocation unit 103 using the reception of the request from the browser 111 as a trigger according to the first embodiment. For example, in steps S401 and S404 in FIG. 8A, and steps S410, S414, and 425 in FIG. 8B, the allocation unit 103 receives the HTTP request from the browser 111. Then, the allocation unit 103 starts the process in FIG. 11 when it receives an HTTP request.

When the allocation unit 103 receives the HTTP request, an HTTP connection between the browser 111 and the Web server 100 is established. Therefore, any connection exists when the process in FIG. 11 starts.

In step S601, the allocation unit 103 determines whether or not there is a session. Practically, the allocation unit 103 can determine whether or not there is a session by referring to the Cookie header of the received HTTP request. If there is no session, control is passed to step S602. On the other hand, if a session exists, the allocation unit 103 recognizes the session ID from, for examples the Cookie header, and control is passed to step S604.

The allocation unit 103 generates a new session in step S602. Practically, the allocation unit 103 issues a new session ID. The process in step S602 is performed when, for example, the process in FIG. 11 starts when the request in step S401 in FIG. 8A is received.

In the next step S603, the allocation unit 103 sets the session ID issued in step S602 to the Set-Cookie header of the HTTP reply, and returns the parent page 300 to the browser 111. It is also possible that the src attribute assigned to the <iframe> block 301 of the parent page 300 is replaced with the path in the request line of the HTTP request. A practical example of step 603 is step S402 in FIG. 8A. After the execution in step S603, the process in FIG. 11 terminates.

On the other hand, if a session exists, in step S604, the allocation unit 103 determines whether or not the URI requested from the browser 111 is a URI including the specific path for DB access. For example, the specific path can be the exemplified "/_reservedForComet".

When the URI requested from the browser 111 is a URI including a specific path including the DB access, control is passed to step S605. On the other hand, when the URI requested from the browser 111 is a URI not including the specific path for DB access (that is, the URI used by the Web application 101), control is passed to step S609.

Upon receipt of the request in step S404 in FIG. 8A, the allocation unit 103 determines in step S604. In steps S411 and S415 in FIG. 8B, the determination in step S604 is performed. Furthermore, when the allocation unit 103 receives the DB access result as an HTTP request in step S425 in FIG. 8B, it performs the determination in step S604.

When the URI requested from the browser 111 is a URI including the specific path for DB access, the allocation unit 103 determines in step S605 whether the method of the HTTP request from the browser 111 is the GET method or the POST method. The allocation unit 103 can recognize the method by referring to the request line of the received HTTP request.

When the GET method is specified in the request line, control is passed to step S606. On the other hand, when the POST method is specified in the request line, control is passed to step S611.

For example, the request in step S404 in FIG. 8A is a request for access to a specific path by the GET method.

Therefore, if the process in FIG. 11 is started when the reception in step S404 is performed, control is passed to step S606.

On the other hand, the HTTP request for notification of the DB access result in step S425 in FIG. 8B is a request for access to a specific path by the POST method. Therefore, if the process in FIG. 11 is started when the reception in step S425 is performed, then control is passed to step S611.

In step S606, the allocation unit 103 adds a new entry to the correspondence table 105. Then, the allocation unit 103 sets the session ID recognized in step S601 in the session ID field of the new entry.

The process in step S606 is performed when the child page 400 for a load to the iframe 113 for a Comet connection is requested by the browser 111 as indicated by step S404 in FIG. 8A. Upon receipt of the HTTP request from the browser 111, the HTTP connection has been established when the process starts as illustrated in FIG. 11. Therefore, the allocation unit 103 in step S606 sets a connection ID for identification of the established connection in the connection ID field of the new entry.

As described above, in step S606, a new pair of a session ID and a connection ID is entered in the correspondence table 105. A practical example of step S606 is step S405 in FIG. 8A.

In the next step S607, the allocation unit 103 enables the script generation unit 104 to generate a script. Practical examples of step S607 are steps S406 and S407 in FIG. 8A. That is, in step S607, the allocation unit 103 enables the script generation unit 104 to generate a script including the address assign statement 402 and the function definition 403.

In the next step S608, the allocation unit 103 returns the page including the generated script in chunked form to the browser 111. A practical example of step S608 is step S408 in FIG. 8A. By the allocation unit 103 returning a page in chunked form (that is, returning an HTTP reply), a connection can be continuously maintained between the iframe 113 of the browser 111 and the Web server 100. After the execution in step S608, the process in FIG. 11 terminates.

When the URI requested by the browser 111 does not include a specific path, the allocation unit 103 stores in step S609 a session ID recognized in step S601 in the thread local function. The stored session ID is referenced in step S501 in FIG. 10 as described above.

In the next step S610, the allocation unit 103 commits the process to the Web application 101. Practically, the allocation unit 103 outputs the HTTP request received from the browser 111 to the Web application 101. Then, the process in FIG. 11 by the allocation unit 103 terminates. The processes in steps S609 and S610 are performed also in step S412 in FIG. 8B, and also in step S416.

On the other hand, when the access from the browser 111 to a specific path in the POST method is requested, the allocation unit 103 performs the process in step S611. The process in step S611 is performed when the allocation unit 103 receives the HTTP request for notification of the DB access result as, for example, in step S425 in FIG. 8B as described above. Therefore, in step S611, the allocation unit 103 practically recognizes the reception of the DB access result.

Then, the process flow in FIG. 11 terminates. On the other hand, the allocation unit 103 also waits for the reception of the DB access result in step S505 in FIG. 10. Therefore, control is passed to step S505 to step S506 in FIG. 10. As a result, the allocation unit 103 outputs the DB access result received from the browser 111 to the DB interface unit 102.

In more detail, in the first embodiment, the thread of the allocation unit 103 temporarily terminates the process in FIG. 11 after committing the process to the Web application 101 in step S610, but is not annihilated. Maintaining the thread without annihilation is expressed by the activation rectangle illustrated in the column of the allocation unit 103 from step S415 to step S426.

The thread which has performed the commission in step S416 corresponding to step S610 starts the process in FIG. 10 upon receipt of the DB access request from the DB interface unit 102 in step S418, and waits for the DB access result in step S505 in FIG. 10. In addition, upon receipt of the DB access result in step S425, the thread starts the process in FIG. 11.

As described above, the thread itself which has accepted the DB access request from the DB interface unit 102 receives the corresponding DB access result from the browser 111. Therefore, the allocation unit 103 recognizes to which DB access request from the DB interface unit 102 the DB access result received from the browser 111 corresponds, and can correctly output the DB access result to the DB interface unit 102.

Obviously, the request ID for identification of the DB access request can be used for management of the correspondence between the DB access request and the DB access result depending on the embodiments. That is, the request ID can be output with the DB access request from the DB interface unit 102 to the allocation unit 103. Then, the function definition 403 can be transformed so that the request ID can be taken with the SQL statement as an argument. The DB access result can be returned with the request ID from the browser 111 to the allocation unit 103, and from the allocation unit 103 to the DB interface unit 102.

As described above, according to the first embodiment, a child page 600 loaded to the iframe 113 is transmitted in chunked form (that is, transmitted bit by bit like streaming), thereby continuously maintaining the connection between the browser 111 and the Web server 100. In addition, whenever the DB access request occurs by the Web application 101, the connection is continuously maintained. As a result, the allocation unit 103 can immediately relay the DB access request to the browser 111.

Then, the browser 111 performs the DB access by proxy according to the DB access proxy script 114, and the DB access result is finally output to the Web application 101 through the allocation unit 103 and the DB interface unit 102. Therefore, the Web application 101 can acquire the DB access result although it is not permitted to directly access the DB server 120.

Thus, according to the first embodiment, the Web application 101 can perform the process using the data of the DB 121 in the intranet 140 separated by the firewall 130 although there is no additional devices such as an interface server, a relay server, etc. Furthermore, the Web application 101 uses the data of the DB 121 only temporarily and partially, and the data of the DB 121 is not stored in the Web server 100 in a non-volatile manner for a long time. Therefore, the first embodiment is applicable when confidential information is included in the DB 121.

Next, the second embodiment is described with reference to FIGS. 12 through 16. In the second embodiment, the technology "long polling" is used to maintain the Comet connection. Practically, the connection is continuously maintained until a reply is returned by the Web server 100 delaying the reply in response to the HTTP request transmitted by the browser 111 according to the DB access proxy script 114 using the XHR object.

In the second embodiment, using the Comet connection (that is, the HTTP connection) maintained as described above, the allocation unit 103 transmits the DB access request to the browser 111. The second embodiment is practically described below.

Figure 12:
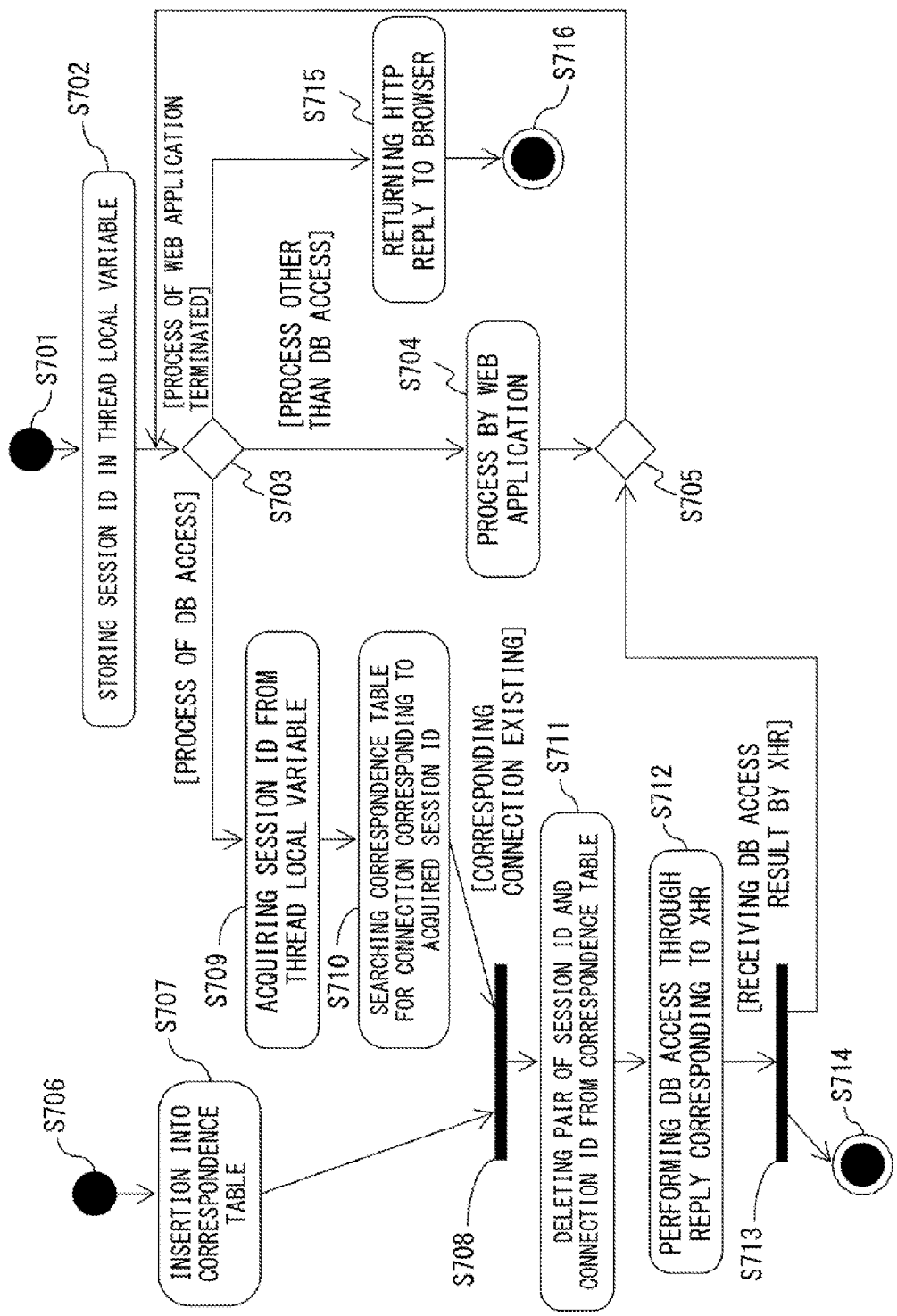
FIG. 12 is an explanatory view of the activity of the operation of the Web server according to the second embodiment.

FIG. 12 illustrates the activity expressed by the UML for explanation of the operation of the Web server 100 according to the second embodiment. The details are described later, but in the second embodiment, the data to be loaded to the iframe 113 is not transmitted separately in chunked form, but is transmitted at once. FIG. 12 is an explanatory view of the operation of the Web server 100 after at least the parent page is transmitted from the Web server 100 to the browser 111. In addition, the process for a load of the child page to the iframe 113 is omitted in FIG. 12.

The flow from the initial node S701 starts with the browser 111 transmitting the HTTP request to load a page to the iframe 112, and the allocation unit 103 receiving the HTTP request. Practically, upon receipt of the HTTP request, the allocation unit 103 stores the session ID in the thread local variable in step S702.

Then, as indicated in the next determining node S703, the subsequent operation may refer to the case in which a process other than the DB access occurs, the case in which the process of the DB access occurs, and the case in which a process of the Web application 101 terminates. Corresponding to each case, control is passed to steps S704, S709, and S715.

When the process other than the DB access occurs, the allocation unit 103 commits the process to the Web application 101 in step S704, and the Web application 101 performs an appropriate process. For example, when a static or dynamic page is requested by the browser 111, the process by the Web application 101 is performed in step S704. Then, control is returned to the determining node S703 through the merging node S705.

On the other hand, the flow from the initial node S706 starts with the browser 111 transmitting the HTTP request for long polling using the XHR object according to the DB access proxy script 114, and the allocation unit 103 receiving the HTTP request. The HTTP request for long polling is practically a request for receiving the HTTP reply including the DB access request in the message body, and is transmitted asynchronously to the HTTP request for a load of a page to the iframe 112. The reply to the HTTP request for long polling is appropriately delayed for maintaining the connection.

Practically, upon receipt of the HTTP request for long polling, the allocation unit 103 inserts a new entry into the correspondence table 105 in step S707. In addition, the allocation unit 103 sets in the session ID field of the new entry a session ID of the session established between the browser 111 and the Web server 100. Then, the allocation unit 103 also sets in the connection ID field of the new entry a connection ID for identification of the HTTP connection established between the browser 111 and the Web server 100 upon receipt of the HTTP request for long polling.

As described above, the HTTP request for long polling is transmitted asynchronously to the HTTP request for a load of a page to the iframe 112. The page of the Web application 101 to be loaded to the iframe 112 is not always accompanied with the DB access. On the other hand, when the allocation unit 103 receives the DB access request from the DB interface unit 102, the condition that the HTTP request for long polling has been received and the HTTP reply has not been returned does not necessarily hold.

After the process in step S707, a queue occurs as indicated by the join node S708. The queue target is the flow in steps S709 and S710.

Practically, the process of the DB access may occur as a result of the commission of the process to the Web application 101 in step S704. Then, in step S709, the allocation unit 103 acquires a session ID from a thread local variable. In the next step S710, the allocation unit 103 searches the correspondence table 105 for the connection corresponding to the acquired session ID.

If the connection is detected as a result of the search in step S710, then the process in step S711 is performed.

However, there is the possibility that the connection is not detected as a result of the search in step S710. If a corresponding connection is not detected, then the process in step S711 is not performed until an entry having a session ID stored in a thread local variable is added to the correspondence table 105 in step S707. That is, a queue is formed.

In step S711, the allocation unit 103 deletes from the correspondence table 105 the pair of the session ID acquired in step S709 and the connection ID associated with the session ID. To be more practical, the allocation unit 103 first stores the connection ID, and then deletes the pair of the session ID and the connection ID.

Furthermore, in the next step S712, the DB access is performed through the HTTP reply in response to the HTTP request using the XHR object.

To be practical, the allocation unit 103 transmits the DB access request to the browser 111 using the connection designated by the connection ID stored in step S711. That is, the allocation unit 103 transmits the DB access request received from the DB interface unit 102 to the browser 111 as the HTTP reply in response to the HTTP request transmitted from the browser 111 for long polling using the XHR object.

Then, upon receipt of the DB access request, the browser 111 performs the DB access by proxy according to the DB access proxy script 114, and transmits the DB access result to the Web server 100. The DB access result is practically included in the message body of the HTTP request (to be practical, the HTTP request in the POST method) using the XHR object, and transmitted to the Web server 100.

Then, the allocation unit 103 receives the DB access result transmitted using the XHR object from the browser 111 as described above, and outputs the DB access result to the DB interface unit 102. Furthermore, the DB interface unit 102 outputs the DB access result to the Web application 101.

Since the guard condition in step S712 is satisfied by the reception of the DB access result, the two flows joining in the join node S708 is separated again as indicated by the fork node S713. That is, the flow from the initial node S706 reaches the final node S714, and the flow in steps S709 and S710 returns to the determining node S703 through the merging node S705.

The browser 111 transmits to the Web server 100 a new HTTP request for long polling again according to the DB access proxy script 114. Therefore, the flow starts with the initial node S706 in the Web server 100.

On the other hand, upon receipt of the DB access result from the DB interface unit 102 in step S712 as described above, the Web application 101 dynamically generates a page using the DB access result as necessary. When the process of generating a page by the Web application 101 is completed, the HTTP reply is returned from the Web server 100 to the browser 111 as indicated by step S715, and flow reaches the final node S716.

Then, an operation example according to the second embodiment is described with reference to the sequence in FIGS. 13A and 13B.

In step S801, the browser 111 transmits the initial request to the Web server 100. Then, the allocation unit 103 receives a request in step S801. Then, in step S802, the allocation unit 103 generates a new session, and returns a parent page specifying the iframe 112 and the iframe 113 as elements.

Steps S801 and S802 are substantially the same as steps S401 and S402 in FIG. 8A. In the first embodiment, there is only one specific path reserved for the Web server 100 enabling the browser 111 to perform the DB access by proxy. However, in the second embodiment, the following three paths (B1) through (B3) are reserved.

(B1) Path for the iframe 113 (hereafter referred to as "/_reservedForIframe" forcibly convenience of explanation).

(B2) Path for accepting the HTTP request for long polling using the XHR object (hereafter referred to as "/_reservedForLP" for convenience of explanation).

(B3) Path for receiving a notification of the DB access result from the browser 111 (hereafter referred to as "/_reservedForDb" for convenience of explanation).

In the three paths above, the path of (B2) for receiving the HTTP request for long polling is the "specific path" requested by the "specific request" described above with reference to FIG. 1.

An example of the parent page transmitted in step S802 is described below with reference to FIG. 14. FIG. 14 is an example of the source code transmitted to the browser 111 according to the second embodiment.

In step S802, for example, a parent page 500 in FIG. 14 is returned. The parent page 500 includes an <iframe> block 501 and an <iframe> block 502.

The <iframe> block 501 in FIG. 14 is an example of an HTML source code for display of the page of the Web application 101 in the iframe 112. The <iframe> block 501 indicates that the width and the height of the iframe 112 are 400 pixels and 600 pixels respectively, and that the relative URI of the source to be loaded to the iframe 112 is "/".

On the other hand, the <iframe> block 502 is an HTML source code for specifying a path for the iframe 113 of (B1) as a source. That is, the <iframe> block 502 is a code for enabling the client machine 110 (practically the browser 111) to acquire the code for enabling the browser 111 to access to the "specific path" of (B2). The code for enabling the browser 111 to access to the "specific path" of (B2) is practically a code of the child page 600 loaded to the iframe 113. The child page 600 is described later in detail.

In the <iframe> block 502, as in the first embodiment, the iframe 113 is set as substantially invisible from the viewpoint of user convenience.

Figure 13A:
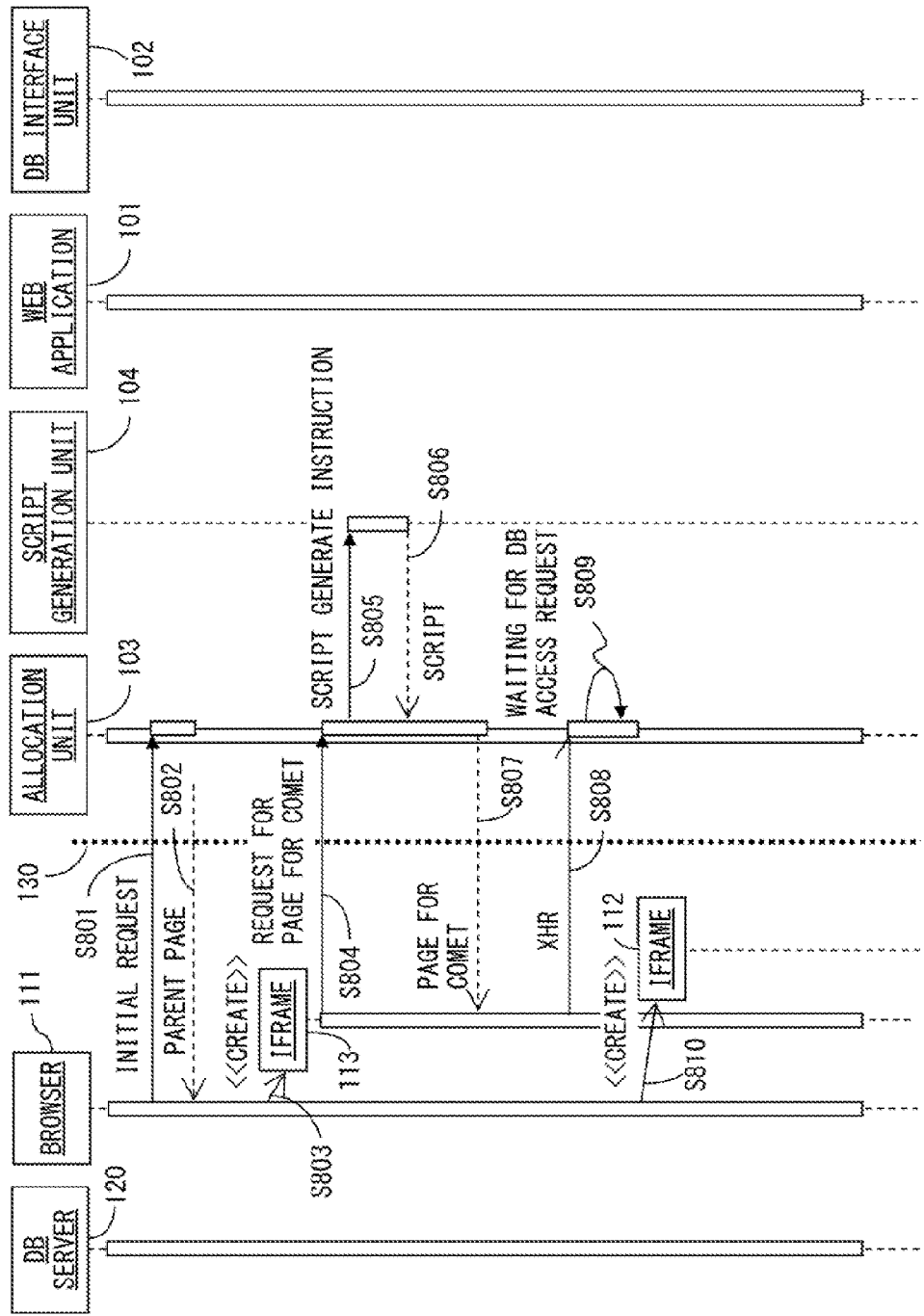
FIG. 13A is a sequence (1) relating to an operation example according to the second embodiment.

In the explanation with reference to FIG. 13A, upon receipt of the parent page 500 in step S802, the browser 111 recognizes that the parent page 500 includes two iframes 112 and 113.

As in the first embodiment, the <iframe> block 501 can be transformed to control the load order of iframe 112 and iframe 113. However, in the second embodiment, a queue as indicated in the join node S708 illustrated in FIG. 12 is performed, thereby requiring no control of the load order.

The example of the operation in FIG. 14 is an example of the case in which a load of a page to the iframe 113 occurs first incidentally. In this case, the iframe 113 is generated in step S803, and the browser 111 transmits the HTTP request corresponding to the URI specified by the <iframe> block 502 to the Web server 100 in step S804.

That is, the browser 111 requests for a page for Comet in step S804. However, the request in step S804 is not a "specific request" for maintaining the Comet connection, but a request for a page including the DB access proxy script 114 for instructing the browser 111 to transmit the specific request. Since the Comet connection is established by the browser 111 transmitting the specific request according to the DB access proxy script 114, the step S804 in FIG. 14 expresses "request for a page for Comet".

Upon receipt of the request in step S804, the allocation unit 103 instructs the script generation unit 104 to generate a script in step S805. Then, the script generation unit 104 generates a script, and outputs the generated script to the allocation unit 103 in step S806.

Then, in step S807, the allocation unit 103 returns a page for Comet including the script acquired from the script generation unit 104 to the browser 111. In step S807, the entire page for a load to the iframe 113 is returned. That is, the chunk form is not used.

An example of a child page loaded to the iframe 113 is described below with reference to FIG. 14 again.

The child page 600 in FIG. 14 includes a <head> element and a <body> element. The <head> element includes a <script> block, and the <script> block includes an address assignment statement 601, a function definition 602 of the "proxy process" described with reference to FIG. 1, and a function definition 603 of a main routine.

In addition, the <body> element also includes a <script> block 604. The <script> block 604 includes an invoke statement of a function defined by the function definition 603.

The invoke statement of the function main can be included in the <script> block in the <head> element. Otherwise, the address assignment statement 601, the function definition 602, and the function definition 603 can be placed before the invoke statement of the function main in the <script> block 604 in the <body> element.

The address assignment statement 601 is similar to the address assign statement 402 in FIG. 9. As the address assign statement 402 can be placed in the function definition 403, the address assignment statement 601 can be placed in the function definition 602.

Furthermore, the function execute2 defined by the function definition 602 uses the SQL statement indicating the DB access request as an argument sql. The function execute2 is substantially the same as the function execute1 according to the first embodiment, but is different in the URI of the destination of the notification of the DB access result embedded in the function definition.

In the first embodiment, a specific path for accepting the specific request in the GET method is also used in receiving a notification of the DB access result in the POST method. Therefore, in the execute1 in the first embodiment, the URI including a specific path of "http://www.foo.com/_reservedForComet" is embedded as the URI of the destination of the notification of the DB access result.

On the other hand, in the second embodiment, a path of the (B3) above, which is different from the specific path of the (B2) above for accepting a specific request is used in accepting the notification of the DB access result. Therefore, in the function definition 602 of the proxy process, the URI of "http://www.foo.com/_reservedForDB" is embedded.

In addition, the function execute2 is defined so that it terminates after the reception or the timeout of the corresponding HTTP reply after the transmission of the DB access result to the Web server 100 in HTTP request form using the XHR object. The HTTP reply corresponding to the HTTP request for transmission of the DB access result is practically the HTTP reply in which, for example, the status code is 200 (OK) and the message body is empty.

The main routine defined by the function definition 603 is practically the routine in which the steps (C1) through (C3) are repeated.

(C1) is a step of generating a new XHR object, and transmitting an HTTP request for long polling (that is, a specific request for a specific path of (B2)) by the new XHR object.

(C2) is a step of waiting for a reply in response to the request of (C1) above, and, upon receipt of a reply, extracting the DB access request (that is, an SQL statement) from the received reply.

(C3) is a step of specifying the extracted SQL statement as an argument, and invoking the function execute2.

When the <script> block 604 including the function invoke statement of the main routine is loaded to the iframe 113, the browser 111 starts executing the function main. As a result, the step of (C1) above is performed. That is, as indicated by step S808 in FIG. 13A, the HTTP request for long polling by the XHR object is transmitted from the browser 111 to the Web server 100, and received by the allocation unit 103.

Then, upon receipt of the request, the allocation unit 103 associates the session with the connection in the next step S809 as indicated by step S707 in FIG. 12. As indicated by the join node S708 in FIG. 12, the allocation unit 103 waits for the DB access request from the DB interface unit 102.

On the other hand, the iframe 112 is generated in step S810, and a load of a page to the iframe 112 occurs in step S811. That is, the browser 111 transmits the HTTP request corresponding to the URI specified by the <iframe> block 501 in FIG. 14 to the Web server 100.

The example in FIG. 14 is also an example of the case in which the top page of the Web application 101 is a static page as in FIGS. 8A and 8B. Therefore, a series of processes similar to those in steps S410 through S413 in FIG. 8B are performed in steps S811 through S814. As a result, the browser 111 displays a static page in the iframe 112.

Then, in step S815, as in step S414 in FIG. 8B, the browser 111 transmits to the Web server 100 the HTTP request for a dynamic page to be loaded to the iframe 112. Then, a series of processes similar to those in steps S415 through S418 in FIG. 8B are performed in steps S816 through 819.

Then, in the next step S820, the allocation unit 103 makes an inquiry about the connection with reference to the correspondence table 105 as indicated in steps S709 and S710 in FIG. 12. In the examples in FIGS. 13A and 13B, since no reply has been returned in response to the request in step S808, a connection is detected as a result of the inquiry in step S820. Then, as described above with reference to step S711 in FIG. 12, the allocation unit 103 stores the connection ID and then deletes the detected entry from the correspondence table 105.

Then, in step S821, the allocation unit 103 transmits the DB access request to the browser 111 as a reply in response to the received HTTP request (request in step S808 in the example in FIG. 13A) as described with reference to step S712 in FIG. 12. Then, the browser 111 performs the process of (C2) and (C3) above according to the DB access proxy script 114.

As a result, by the invocation of the function execute2, the HTTP request from the browser 111 to the DB server 120 is transmitted using the XHR object in step S822. The message body of the HTTP request in step S822 includes the DB access request. Then, upon receipt of the DB access request, the DB server 120 accesses the DB 121 at the DB access request, and acquires the DB access result.

In step S823, the DB server 120 returns to the browser 111 the acquired DB access result as the HTTP reply in response to the HTTP request in step S822.

Then, upon receipt of the DB access result, the browser 111 transmits the DB access result to the Web server 100 in step S824. The details of steps S822 through S824 are similar to those of steps S423 through S425 in FIG. 8B.

The DB access result transmitted as described above is received by the allocation unit 103. Then, the allocation unit 103 outputs the DB access result to the DB interface unit 102 in step S825. In step S826, the DB interface unit 102 outputs the DB access result to the Web application 101. Steps S825 and S826 correspond to step S712 in FIG. 12, and are similar to steps S426 and S427 in FIG. 8B.

Upon acquisition of the DB access result from the DB interface unit 102, the Web application 101 dynamically generates a page using the acquired DB access result in step S5827. In step S827, the Web application 101 returns to the browser 111 the generated dynamic page as the HTTP reply in response to the HTTP request in step S815. Step S827 is similar to step S428 in FIG. 8B. The transmission of the HTTP reply in step S827 corresponds to step S715 in FIG. 12.

Figure 13B:
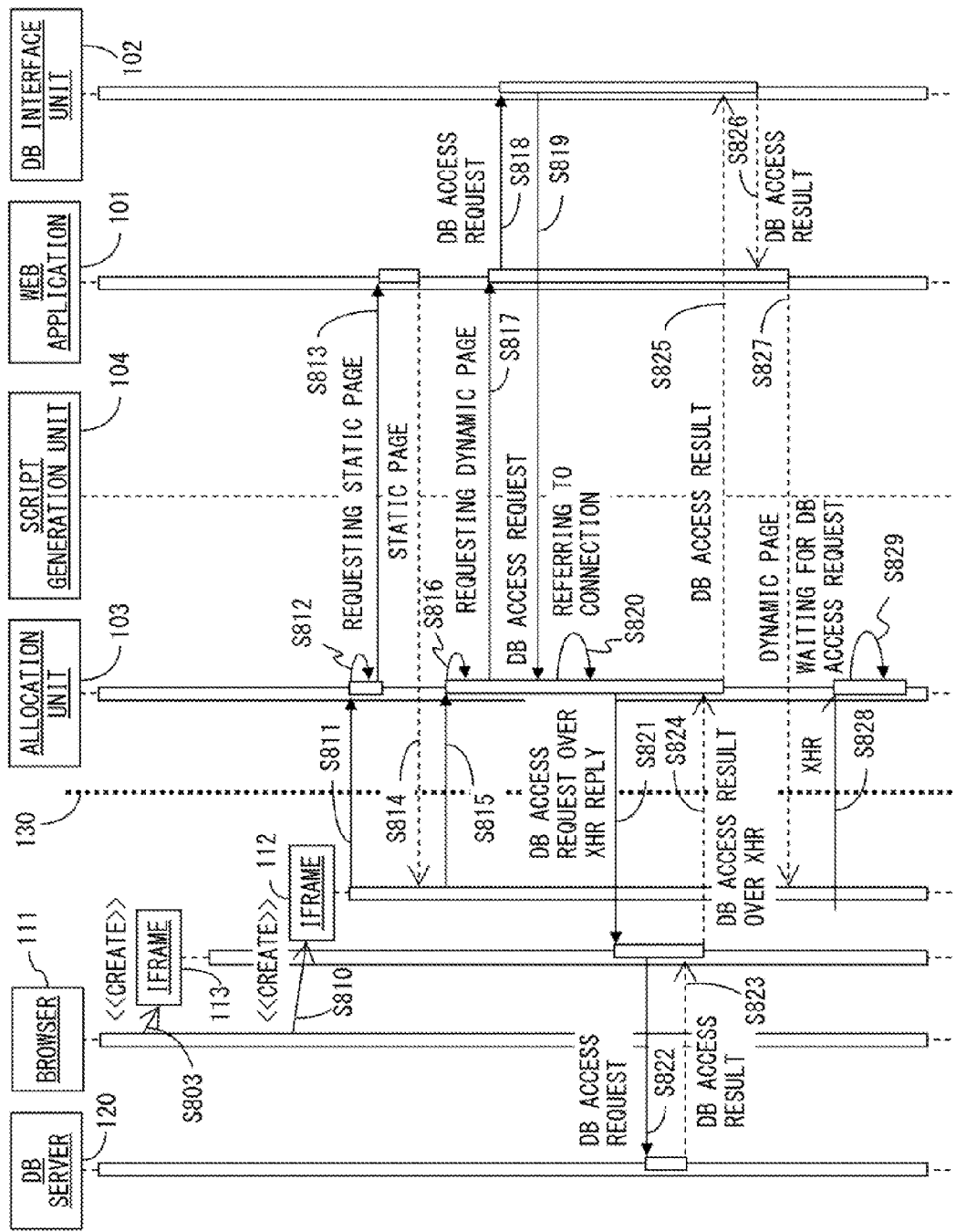
FIG. 13B is a sequence (2) relating to an operation example according to the second embodiment.

Although omitted for convenience of paper width in FIG. 13B, upon receipt of the DB access result in step S824, the allocation unit 103 returns to the browser 111 the HTTP reply in which the message body is empty as described above. As a result, the browser 111 completes the execution of the function execute2 in (C3) above.

Then, the browser 111 performs the step of (C1) again according to the function definition 603 of the main routine. That is, in step S828 the browser 111 transmits the HTTP request for long polling using the XHR object again as in step S808. Then, in the next step S829, the allocation unit 103 performs a process similar to that in step S809.

The examples in FIGS. 13A and 13B explained above are only examples in various operation examples. Like those described with reference to FIGS. 8A and 13B, there can be various variations with respect to FIGS. 13A and 13B.

For example, after the dynamic page is returned to the browser 111 in step S827, another dynamic page can be requested. Otherwise, the generation of one page can be accompanied with a plurality of DB access requests. In addition, the top page of the Web application 101 is not always limited to a static page. The type of DB access request can refer to any of reference, addition, update, and deletion. Regardless of the type of DB access request, the DB access is performed by proxy by the browser 111.

When the process described above with reference to FIGS. 5 through 7 can be described below in detail with reference to FIGS. 12 through 14.

As illustrated in FIG. 5, the browser 111 operates according to the DB access proxy script 114 loaded to the iframe 113. In the example in FIG. 14, the DB access proxy script 114 practically includes the address assignment statement 601, the function definition 602 as a proxy process, the function definition 603 as a main routine, and the function invoke statement of the main routine in the <script> block 604.

As indicated by step S101 in FIG. 5, the browser 111 waits for the reception of the DB access request from the Web server 100. In the second embodiment, step S101 includes the transmission of the HTTP request for long polling in step S808 in FIG. 13A. Furthermore, the standby in step S101 corresponds to waiting for the reception of the DB access request in HTTP reply form in step S821 after the transmission in step S808 in the examples in FIGS. 13A and 13B.

Step S102 in FIG. 5 corresponds to step S822 in FIG. 13B. In addition, as indicated by step S103 in FIG. 5, the browser 111 waits for the reception of the DB access result from the DB server 120. In the example in FIG. 13B, the browser 111 waits for the reception of the DB access result in step S823.

Then, step S104 in FIG. 5 corresponds to step S824 in FIG. 13B. In FIG. 5, control is returned from step S104 to step S101. By the loop in FIG. 5, the DB access is performed by proxy by the browser 111 when a plurality of dynamic pages are requested as described above, or when one page is accompanied with a plurality of DB access requests. The loop in FIG. 5 is realized by the loop in the function main in the second embodiment.

That is, the function definition 603 of the main routine in FIG. 14 defines the entire flow in FIG. 5. The function definition 602 as a proxy process defines the operation in steps S102 through S104 in FIG. 5. The <script> block 604 is a code for instructing the browser 111 to start the process in FIG. 5.

The DB interface unit 102 whose operation is illustrated in FIG. 6 is the same as that in the first embodiment.

Step S301 in FIG. 7 is not clearly described in FIGS. 13A and 13B. The script generation unit 104 waits for the reception of the script generate instruction from the allocation unit 103 in step S302 after the execution in step S301. In the example in FIG. 13A, the script generation unit 104 waits for step S805.

The contents of the script generated by the script generation unit 104 in step S303 in FIG. 7 are practically the <script> block in the <head> element and the <script> block 604 in the <body> element included in the child page 600 in FIG. 14.

Control in FIG. 7 is returned from step S304 to step S302 again. Therefore, by the loop in FIG. 7, each script corresponding to the request from a plurality of browsers is generated by the script generation unit 104.

Then, the operation of the allocation unit 103 according to the second embodiment is described below in detail with reference to FIGS. 15 and 16.

Figure 15:
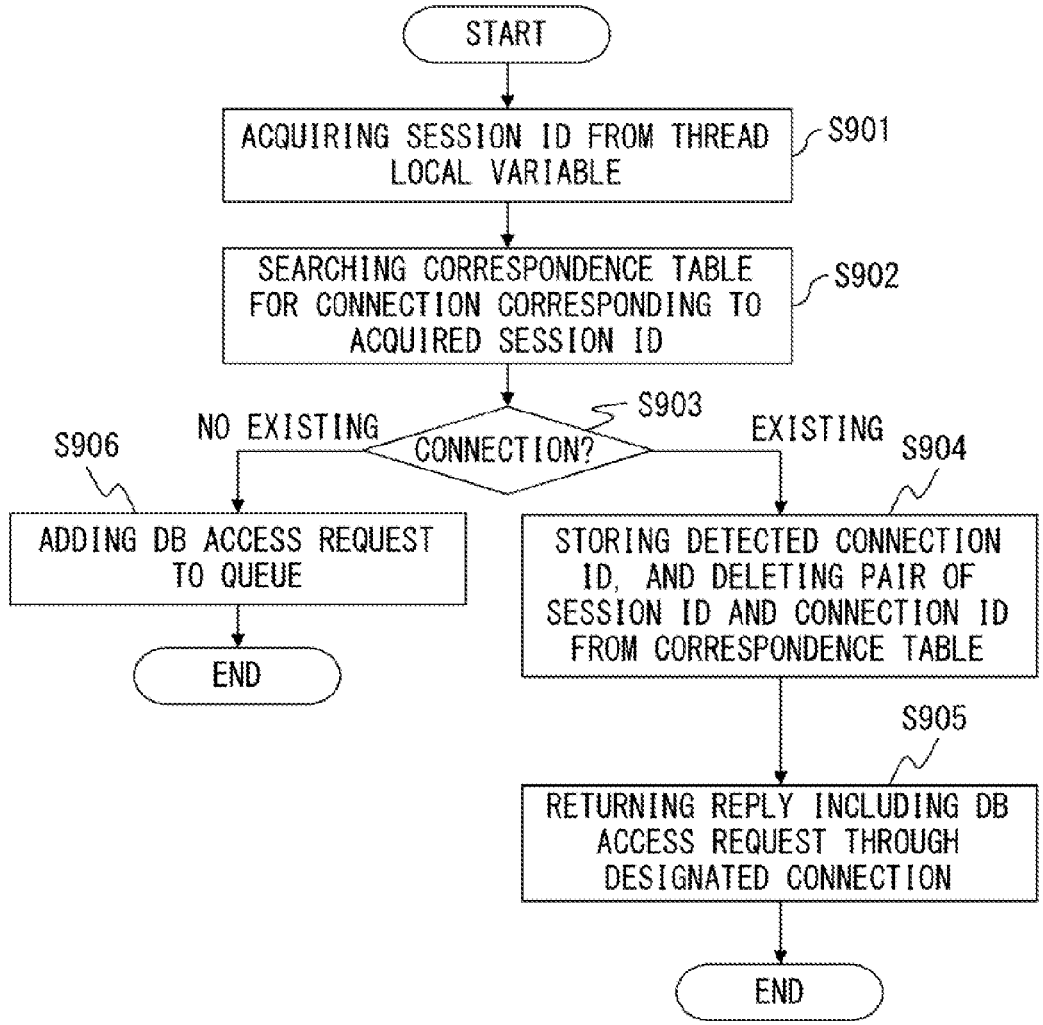
FIG. 15 is a flowchart of the process performed by the allocation unit using the reception of a DB access request from the DB interface unit associated with a trigger in the second embodiment.

FIG. 15 is a flowchart of the process performed when the allocation unit 103 receives the DB access request from the DB interface unit 102 in the second embodiment. For example, upon receipt of the DB access request in step S819 in FIG. 13B, the allocation unit 103 starts the process in FIG. 15.

In step S901, the allocation unit 103 acquires a session ID from a thread local variable. Step S901 is similar to step S501 in FIG. 10, and corresponds to step S709 in FIG. 12.

Next, in step S902, the allocation unit 103 searches the correspondence table 105 for the connection corresponding to the session ID acquired in step S901. Although step S902 is similar to step S502 in FIG. 10, but there is also a difference. That is, in step S502, one connection is detected so far as there is no unexpected error while there is no guarantee of detecting a connection in step S902. As described above with reference to the join node S708 in FIG. 12, no connection is detected when, for example, the allocation unit 103 accepts the DB access request in step S819 before the reception of the HTTP request in step S808 in FIG. 13A.

Then, in the next step S903, the allocation unit 103 determines whether or not a connection has been detected as a result of the search in step S902. If a connection has been detected, control is passed to step S904. On the other hand, if no connection has been detected, control is passed to step S906.

In step S904, the allocation unit 103 stores the connection ID of the entry detected as a result of the search in step S902, and deletes the detected entry (that is, a pair of the session ID and the connection ID) from the correspondence table 105.

Step S904 corresponds to step S711 in FIG. 12. The connection ID stored in step S904 is practically the connection ID of the connection continuously maintained after the allocation unit 103 receives the HTTP request transmitted by the browser 111 in the past using the XHR object.

Then, in the next step S905, the allocation unit 103 transmits the DB access request to the browser 111 through the connection designated by the connection ID stored in step S904. That is, the allocation unit 103 returns the HTTP reply in which the DB access request is included in the message body as the HTTP reply in response to the HTTP request using the XHR object which has been put off for maintaining the connection.

Step S905 is apart of step S712 in FIG. 12. A practical example of step S905 is step S821 in FIG. 13B.

After the execution in step S905, the process flow in FIG. 15 terminates, but the thread of the allocation unit 103 does not annihilate. In the thread of the allocation unit 103, the process in FIG. 16 starts when the DB access result is received from the browser 111.

On the other hand, if no connection is detected as a result of the search in step S902, the allocation unit 103 performs the process in step S906. The process in step S906 is a process for a queue expressed in the join node S708 in FIG. 12.

Practically, the allocation unit 103 holds the queue of the DB access request for each session ID in memory for the queuing process. Therefore, in step S906, the allocation unit 103 adds the DB access request from the DB interface unit 102 which is the trigger of starting the process in FIG. 15 to the queue corresponding to the session ID acquired in step S901.

Then, the process flow in FIG. 15 terminates, but the thread of the allocation unit 103 does not annihilate. In the thread of the allocation unit 103, the process in FIG. 16 starts when a new HTTP request for long polling using the XHR object is received.

Figure 16:
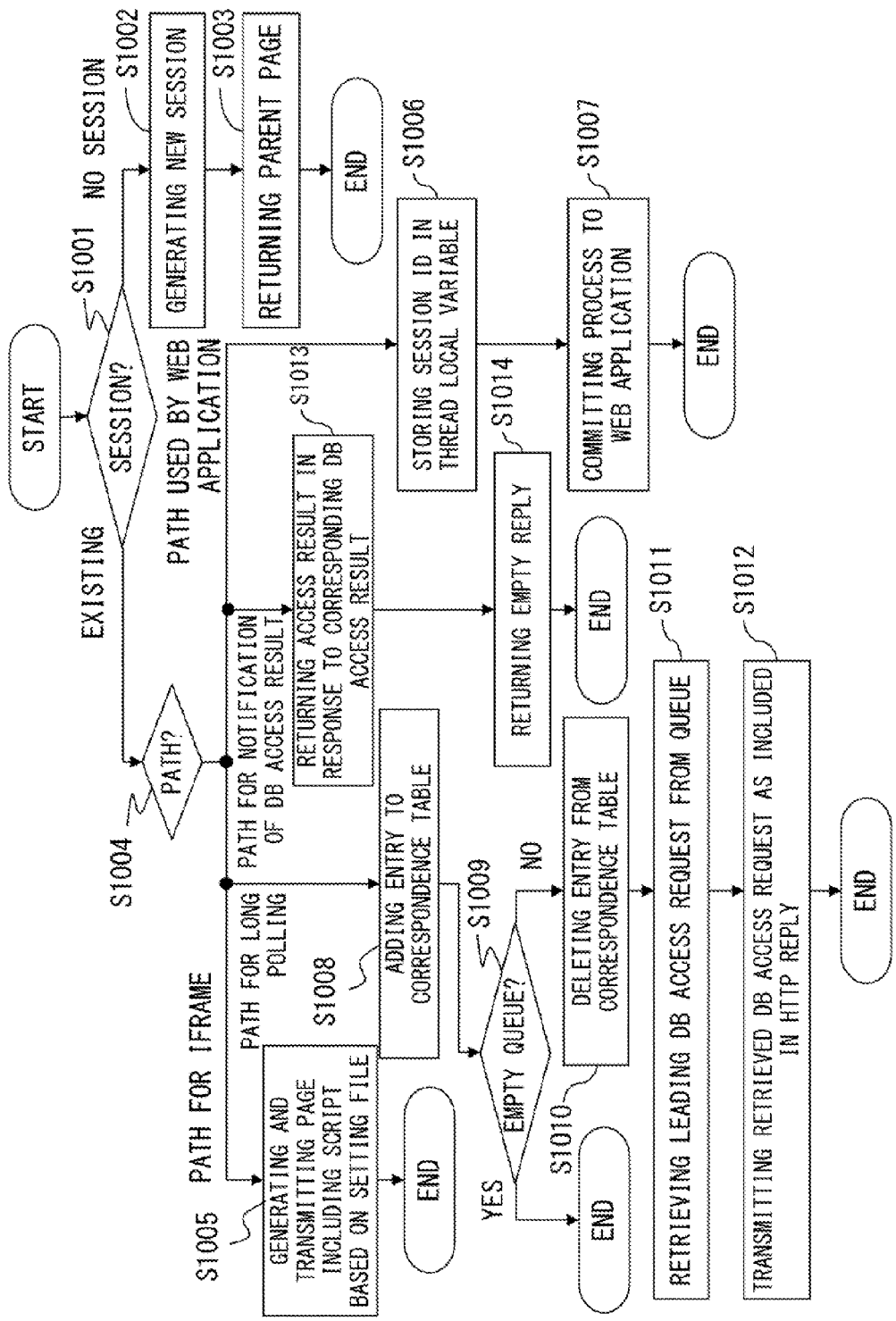
FIG. 16 is a flowchart of the process performed by the allocation unit using the reception of a request from the browser as a trigger in the second embodiment.

FIG. 16 is a flowchart of the process performed when the allocation unit 103 receives a request from the browser 111 in the second embodiment. For example, in steps 801, S804, and S808 in FIG. 13A, and steps S811, S815, S824, and S828 in FIG. 13B, the allocation unit 103 receives the HTTP request from the browser 111. Then, the allocation unit 103 starts the process in FIG. 16 when the HTTP request is received.

When the allocation unit 103 receives the HTTP request, the HTTP connection is established between the browser 111 and the Web server 100. Therefore, any connection exists when the process in FIG. 16 is started.

In step S1001, the allocation unit 103 determines whether or not there is a session as in step S601 in FIG. 11. If there is no session, control is passed to step S1002. On the other hand, if there is a session, the allocation unit 103 recognizes the session ID, and control is passed to step S1004.

In step S1002, the allocation unit 103 generates a new session. Practically, the allocation unit 103 issues a new session ID. Step S1002 is executed when, for example, the process in FIG. 16 is started when the request in step S801 in FIG. 13A is received.

In the next step S1003, the allocation unit 103 sets the session ID issued in step S1002 in the Set-Cookie header in the HTTP reply, and returns the parent page 500 to the browser 111. It is also possible to set the src attribute assigned to the <iframe> block 501 of the parent page 500 as a path on the request line of the HTTP request instead of "/". A practical example of step S1003 is step S802 in FIG. 13A. After the execution in step S1003, the process in FIG. 16 terminates.

On the other hand, when a session already exists, the allocation unit 103 determines the type of the URI requested from the browser 111 in step S1004.

When the requested URI includes a path for the iframe 113 above (B1), control is passed to step S1005. For example, when the process in FIG. 16 is started when the request in step S804 in FIG. 13A is received, control is passed to step S1005.

When the requested URI includes a path for accepting the HTTP request (that is, a specific request) for long polling described above (B2), control is passed to step S1008. For example, if the process in FIG. 16 is started when the request in step S808 in FIG. 13A or S828 in FIG. 13B is received, control is passed to step S1008.

If the requested URI includes a path for notification of the DB access result described above (B3), control is passed to step S1013. For example, if the process in FIG. 16 is started when the allocation unit 103 receives the notification of the DB access result in HTTP request form in step S824 in FIG. 13B, control is passed to step S1013.

If the requested URI does not include any of the above-mentioned paths (B1) through (B3) (that is, if the request URI refers to a normal path for use by the Web application 101), control is passed to step S1006. For example, if the process in FIG. 16 is started when the request in step S811 or S815 in FIG. 13B is received, then control is passed to step S1006.

Upon receipt of the request to the URI including the path for the iframe 113 of (B1) from the browser 111, the allocation unit 103 enables the script generation unit 104 to generate a script based on the setting file 106 in step S1005. The allocation unit 103 generates a page including the script generated by the script generation unit 104, and transmits the generated page to the browser 111. After the execution in step S1005, the process in FIG. 16 terminates.

The practical examples in step S1005 are steps S805 through S807 in FIG. 13A. The practical examples of a script generated by the script generation unit 104 in step S1005 are the <script> block in the <head> element and the <script> block 604 in the <body> element of the child page 600 in FIG. 14. That is, the example of the page generated by the allocation unit 103 in step S1005 is the child page 600 in FIG. 14.

When the URI requested from the browser 111 does not include any path of the (B1) through (B3) above, the allocation unit 103 stores the session ID recognized in step S1001 in the thread local variable in step S1006. The session ID stored here is referenced in step S901 in FIG. 15 as described above.

In the next step S1007, the allocation unit 103 commits the process to the Web application 101. Practically, the allocation unit 103 outputs the HTTP request received from the browser 111 to the Web application 101. Then, the process by the allocation unit 103 in FIG. 16 terminates.

Step S1006 corresponds to step S702 in FIG. 12, and step S1007 is a part of step S704 in FIG. 12. The processes in step S1006 and S1007 are also performed in steps S813 and S817 in FIG. 13B.

Upon receipt of the request from the browser 111 to the URI including the path for accepting the HTTP request (that is, a specific request) for long polling in (B2), the allocation unit 103 performs the processes in and after step S1008.

Practically, in step S1008, the allocation unit 103 inserts a new entry into the correspondence table 105. The allocation unit 103 sets the session ID recognized in step S1001 in the session ID field of the new entry. Then, the allocation unit 103 sets in the connection ID field of the new entry the connection ID for identification of the HTTP connection established between the browser 111 and the Web server 100 by receiving the HTTP request for long polling. Step S1008 corresponds to step S707 in FIG. 12.

Then, in the next step S1009, the allocation unit 103 determines whether or not the queue described with reference to FIG. 15 is empty. Practically, the allocation unit 103 determines whether or not the queue corresponding to the session ID recognized in step S1001 is empty.

An empty queue refers to the case in which the allocation unit 103 receives the HTTP request for long polling before receiving the DB access request from the DB interface unit 102. Therefore, until the allocation unit 103 next receives the DB access request from the DB interface unit 102, the HTTP reply in response to the HTTP request for long polling is put off. That is, there is no process to be processed by the allocation unit 103 in response to the received HTTP request for long polling as of this moment. Therefore, the process in FIG. 17 terminates.

On the other hand, a non-empty queue refers to the case in which the allocation unit 103 has received the DB access request from the DB interface unit 102 before receiving the HTTP request for long polling. Therefore, the allocation unit 103 does not delay the HTTP reply in response to the received HTTP request for long polling, but transmits the DB access request stored in the queue in HTTP reply form to the browser 111.

That is, in step S1009, a non-empty queue refers to the case in which the guard condition in step S710 in FIG. 12 has not been satisfied, but the guard condition is satisfied by receiving the HTTP request for long polling. Thus, when a queue is not empty, control is passed to step S1010.

Then, in step S1010, the allocation unit 103 stores the connection ID of the entry added to the correspondence table 105 in step S1008, and deletes the entry added to the correspondence table 105 in step S1008 from the correspondence table 105. Step S1010 corresponds to step S711 in FIG. 12.

In the next step S1011, the allocation unit 103 retrieves the leading DB access request from the queue.

In the next step S1012, the allocation unit 103 transmits to the browser 111 the DB access request retrieved in step S1011. Practically, the allocation unit 103 returns to the browser 111 the DB access request retrieved from the queue by including it in the HTTP reply in response to the received HTTP request (that is, the HTTP request for long polling using the XHR object), thereby terminating the process in FIG. 16. Steps S1011 and S1012 are a part of step S712 in FIG. 12.

Upon receipt of the request from the browser 111 to the URI including the path for notification of the DB access result of (B3), the allocation unit 103 performs the processes in steps S1013 and S1014. Although the processes in steps S1013 and S1014 are performed when the guard condition in step S712 in FIG. 12 is satisfied, but it is not clearly illustrated in FIG. 12.

Practically, the allocation unit 103 returns a DB access result in response to the DB access request from the DB interface unit 102 corresponding to the DB access result received from the browser 111 in step S1013. The practical example in step S1013 is step S825 in FIG. 13B.

In the second embodiment as in the first embodiment, the allocation unit 103 receives the DB access request from the browser 111 in the same thread in which the DB access request from the DB interface unit 102 is received. Therefore, the allocation unit 103 can recognize to which DB access request the DB access result received from the browser 111 corresponds. Obviously, depending on the embodiments, the request ID for identification of the DB access request can be used for management of the correspondence between the DB access request and the DB access result.

In the next step S1014, the allocation unit 103 returns an HTTP reply in which the message body is empty in response to the HTTP request transmitted using the XHR object from the browser 111 for notification of the DB access result, thereby terminating the process in FIG. 16.

As described above, according to the second embodiment, the connection between the browser 111 and the Web server 100 is maintained by the allocation unit 103 delaying the reply in response to the HTTP request transmitted by the browser 111 according to the DB access proxy script 114.

When the reply is returned and the connection is disconnected as a result of the reply, the browser 111 transmits a new HTTP request at the DB access proxy script 114. Therefore, the new connection is maintained while the reply in response to the new HTTP request is delayed.

That is, in the second embodiment, one connection is not continuously maintained as in the first embodiment, but the connections are sequentially switched. However, according to the second embodiment, when one connection is disconnected, a new connection is immediately established. Therefore, the second embodiment can realize the state almost the same as the state in which a connection is constantly maintained between the browser 111 and the Web server 100.

That is, according to the second embodiment, there can occur a short waiting time while the DB access request is enqueued. However, except the short waiting time, the allocation unit 103 can immediately relay the DB access request to the browser 111 whenever the DB access request occurs by the Web application 101.

The browser 111 performs the DB access by proxy according to the DB access proxy script 114, and the DB access result is finally output to the Web application 101 through the allocation unit 103 and the DB interface unit 102. Therefore, the Web application 101 can acquire the DB access result although it is not permitted to directly access the DB server 120.

Thus, according to the second embodiment, without an additional device such as an interface server, a relay server, etc., the Web application 101 can perform the process using the data of the DB 121 in the intranet 140 separated by the firewall 130. In addition, the Web application 101 only uses the data of the DB 121 temporarily or partially, and the data of the DB 121 is not stored for a long time in a non-volatile manner. Therefore, the second embodiment is applicable also when the DB 121 includes confidential information.

The second embodiment described above can be varied so that one HTTP request using the same XHR object functions as a notification of the DB access result in step S824 in FIG. 13B and also as a request for long polling in step S828. Practically, for example, the following variation is realized.

First, the function execute2 in FIG. 14 is varied so that after transmitting the DB access result to the Web server 100 in HTTP request form using the XHR object, and receiving a corresponding HTTP reply, a message body of the received reply can be returned as a return value. That is, the varied function execute2 is to act as a proxy DB access request, return the DB access result to the Web server 100, and receive the next DB access request.

The function main in FIG. 14 is also varied to repeat the steps of (D4) after executing the steps of the following (D1) through (D3).

(D1) is a step of generating a new XHR object, and transmitting an HTTP request for long polling using a new XHR object (that is, a specific request for a specific path of (B2)).

(D2) is a step of waiting for a reply in response to the request of (D1) above, and extracting the DB access request from the received reply upon receipt of the reply (that is, the SQL statement indicating the first DB access request).

(D3) is a step of assigning the character string of the SQL statement extracted in (D2) above to the variable ("q" for convenience of explanation) to be provided as an argument for the function execute2.

(D4) is a step of invoking the function execute2 by providing the variable q as an argument, acquiring a return value (that is, the SQL statement indicating the next DB access request), and assigning the acquired return value to the variable q (that is, the step of "q=execute2(q);").

The path for receiving the DB access result above (B3) is not necessary in this variation example. The process in FIG. 16 performed by the allocation unit 103 is varied as follows.

That is, the path determined in step S1004 is the path above (B2) for receiving the HTTP request for long polling, the allocation unit 103 determines whether or not the message body of the received HTTP request is empty. If the message body is empty, the notification of the DB access result is not issued. Therefore, the allocation unit 103 performs the processes in and after step S1008. On the other hand, if the message body is not empty, the allocation unit 103 performs the process in step S1013, the process in the next step S1014 is omitted. The processes in and after step S1008 is performed instead.

For example, by the variation above, steps S824 and S828 in FIG. 13B can be realized by the same single HTTP request. As a result, the traffic between the 100 and the client machine 110 can be reduced.

Next, an example of a variation applicable to any of the first and second embodiments above is described. Practically, the variation of the setting file 106 and the variation of the process accompanying the variation are described below with reference to FIGS. 17 through 19.

FIG. 17 is another example of the setting file 106. The setting file 106*a* in FIG. 2 includes only an item "DB address" for access to the DB server 120 by the browser 111. However, the setting file 106 further including another item can be used.

For example, a setting file 106*b* in FIG. 17 further includes an item "private key" in addition to the DB address as with the setting file 106*a*. In FIG. 17, the value "abcdef0123456789" is exemplified as an example of the value of the private key for convenience of explanation, but the value of the private key is optional.

The private key stored in the setting file 106*b* is a private key of the Web server 100 (that is, a private key of a SaaS vender or a ASP for providing the Web application 101). The corresponding public key is stored in advance in the DB server 120.

Then, in the variation example in which the setting file 106*b* is used, when the DB access request is transmitted to the browser 111, a signature is attached. Practically, the first and the second embodiments can be varied as follows.

A change made when the first embodiment is varied so that the private key can be used is described below.

First, the function execute1 in FIG. 9 is varied so that a signature is attached as another argument. Furthermore, the function execute1 is varied so that a signature can be included in the message body of the same HTTP request and transmitted when the DB access request (that is, the SQL statement expressed by the argument sql) is transmitted to the DB server 120 using the XHR object.

Furthermore, the allocation unit 103 generates a signature in step S503 in FIG. 10. Then, the allocation unit 103 specifies not only the SQL statement indicating the DB access request but also a signature as the information used in generating a script for the script generation unit 104. Then, the script generation unit 104 generates the <script> block including the invoke statement of the function execute1 using the SQL statement and the signature specified by the allocation unit 103 as arguments. The chunk including the <script> block generated as described above is transmitted in step S504 in FIG. 10.

The method of generating a signature by the allocation unit 103 and the contents of the recognizing process by the DB server 120 can be varied depending on the embodiment.

For example, the allocation unit 103 acquires a time stamp during the runtime in step S503. Furthermore, the allocation unit 103 calculates a hash value from the SQL statement using an encrypting hash function such as a SHA (secure hash algorithm)-1 etc. Then, the allocation unit 103 generates a signature by encrypting using a private key the character string obtained by coupling the time stamp to the hash value.

When the browser 111 executes the function execute1 having the SQL statement and the signature as arguments, the signature is transmitted to the DB server 120 with the SQL statement. The DB server 120 acquires the time stamp and the hash value by decoding the signature by the public key. Furthermore, the DB server 120 calculates a hash value using the hash function used by the allocation unit 103 from the SQL statement transmitted from the browser 111.

The DB server 120 compares the two hash values obtained by the decoding and calculating operations above. If the two hash values are different, the DB server 120 determines that an illegal DB access request has been received, and can perform appropriate error processing.

As a countermeasure against a replay attack, the DB server 120 can store the pair of the time stamp and the hash value obtained by the decoding process in the table on the memory for a specified time. Then, the DB server 120 checks whether or not the same pair of the time stamp and the hash value is stored in the table when the two hash values obtained by the decoding and calculating processes are the same as each other. If the same pairs are stored, the DB server 120 determines that there has been a replay attack, and appropriate error processing can be performed.

Depending on the type of DB access request, the repetition of the same request may not be permitted. For example, the repetition of the reference request for the same data may be permitted, but the repetition of the delete request for the same data may not be permitted.

If the same pairs are not detected in searching the table, the DB server 120 can further perform the following checking process. That is, when a DB access request of the type for which the repetition is not permitted, the DB server 120 can check whether or not the same hash value obtained by the decoding operation has been stored in the table. If the same hash value is detected, the DB server 120 can perform the error processing.

The DB server 120 and the Web server 100 can be synchronized at the correct time by, for example, the NTP (network time protocol) etc. The DB server 120 can perform appropriate error processing depending on the difference between the time stamp obtained by the decoding operation and the current time. For example, the DB server 120 can perform the error processing when the time difference is equal to or exceeding a threshold.

Then, the DB server 120 can practically access the DB 121 only in response to the DB access request not to be error-processed as exemplified above.

Described below is the change to be made when the second embodiment is varied so that the private key can be used.

First, the function execute2 in FIG. 14 is varied so that a signature is to be attached as another argument. Furthermore, the function execute2 is varied so that the signature can be transmitted in the message body of the same HTTP request when the DB access request (that is, the SQL statement expressed by the argument sql) is transmitted to the DB server 120 using the XHR object. Then, the function main in FIG. 14 is varied so that not only the SQL statement, but also the signature can be extracted from the HTTP reply received from the allocation unit 103 in the step (C2) above.

The allocation unit 103 generates a signature in step S905 in FIG. 15 or in step S1012 in FIG. 16. Then, the allocation unit 103 includes in the message body of the HTTP reply transmitted in step S905 or S1012 not only the SQL statement indicating the DB access request but also the generated signature.

The method of generating a signature by the allocation unit 103 and the contents of the authenticating process using the signature by the DB server 120 are not specifically limited. A signature using a time stamp and a hash function as exemplified relating to the variation according to the first embodiment can be used, and the authentication using the signature can be performed by the DB server 120.

Back in the explanation of FIG. 17, the setting file 106*a* in FIG. 2 can be replaced with, for example, a setting file 106*c* in FIG. 17. The setting file 106*c* further includes two items a "table name on the intranet" and a "table name on the Internet" in addition to the DB address similar to that of the setting file 106*a*. The information expressed by these two items is also referred to as "location information".

In the example of the setting file 106*c*, two table names "client" and "order" are practically stored as the "table names on the intranet", and two table names "goods" and "cart" are stored as the "table names on the Internet". That is, location information 107 indicates that the "client" table and the "order" table are in the intranet 140, and the "goods" table and the "cart" table are outside the intranet 140.

To be more general, the location information 107 associates the identification information about each table included in the DB 121 with the DB 121, and the identification information about each table included in DB 181 with the DB 181. In FIG. 17, a table name is used as the identification information about each table.

Figure 18:
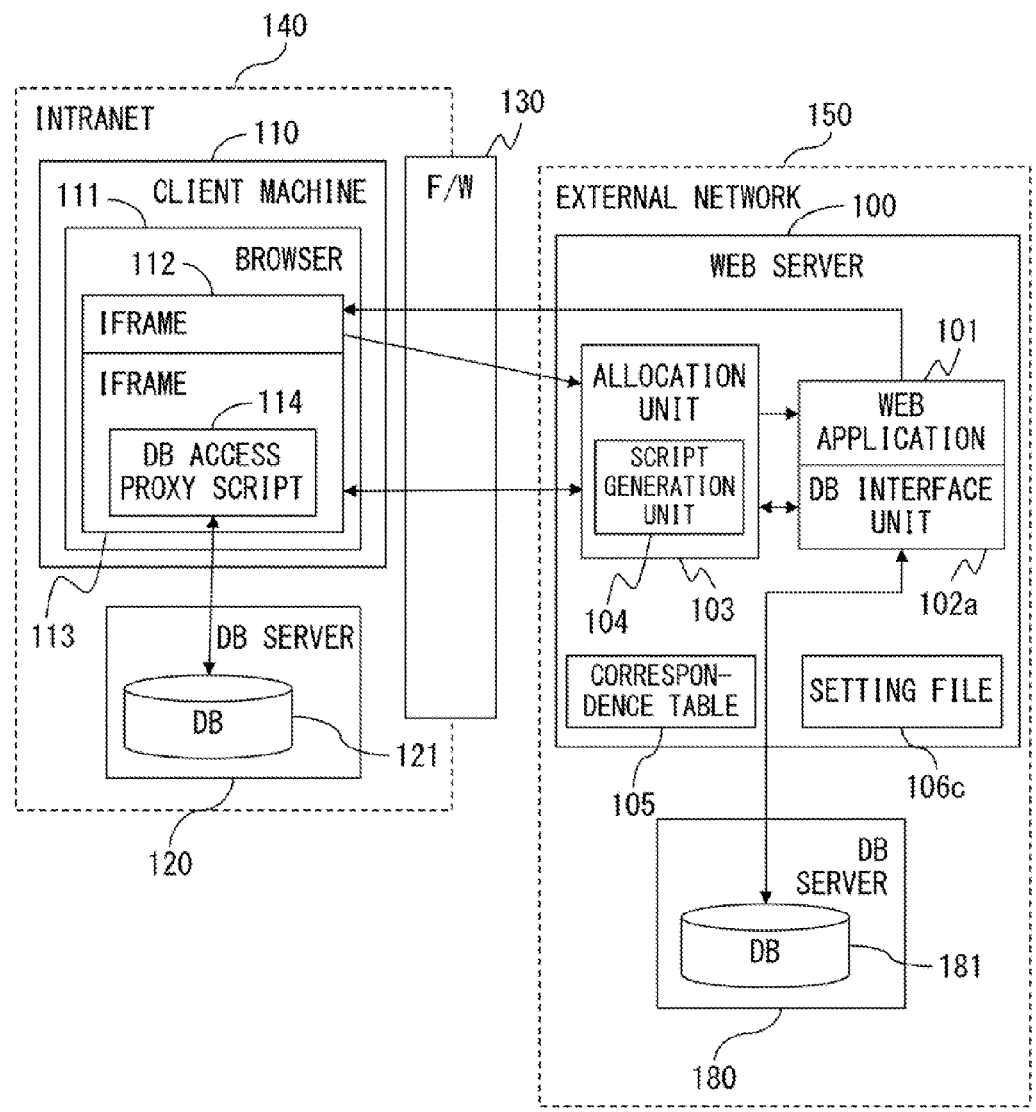
FIG. 18 is a configuration of the system of a variation example.

The setting file 106*c* including the location information 107 is used in the case illustrated in FIG. 18 in which the DB is dispersed in the intranet 140 and the external network 150. When the setting file 106*c* is used, the operation of the DB interface unit 102 is changed as illustrated in FIG. 19.

FIG. 18 is the configuration of the system of a variation example. The difference between FIG. 1 and FIG. 18 is described below.

Figure 19:
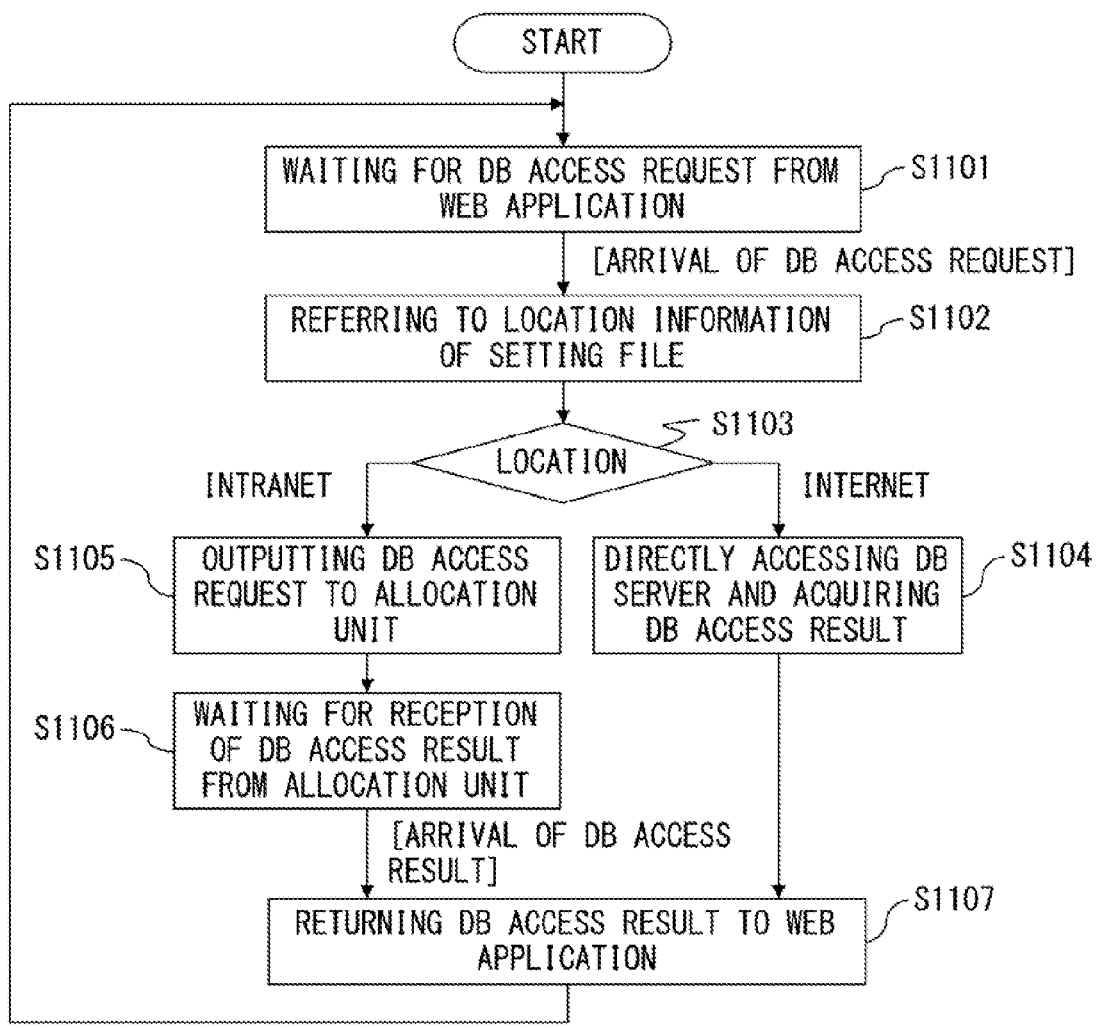
FIG. 19 is a flowchart for explanation of the operation of the DB interface unit of a variation example.

In the variation example in FIG. 18, the DB interface unit 102 in FIG. 1 operating according to the flowchart in FIG. 6 is replaced with a DB interface unit 102*a* operating according to the flowchart in FIG. 19. The interface provided for the Web application 101 by the DB interface unit 102*a* is the same as the interface provided for the Web application 101 by the DB interface unit 102.

In addition, a DB server 180 capable of accessing from the DB interface unit 102*a* of the Web server 100 is further provided in the external network 150. The DB server 180 stores the DB 181.

The DB interface unit 102*a* is also realized by, for example, the CPU 201 in FIG. 4 executing the program. The DB interface unit 102*a* communicates with the DB server 180, but the communication function of the DB interface unit 102*a* is realized by, for example, the network connection device 203 in FIG. 4.

According to the example of the setting file 106*c* in FIG. 17, the table included in the DB 121 in the intranet 140 refers to two tables "client" and "order". According to the example of the setting file 106*c*, the table included in the DB 181 in the external network 150 refers to two tables "goods" and "cart".

The DB interface unit 102*a* refers to the setting file 106*c*, and determines enabling the browser 111 to perform the DB access by proxy or performing the DB access by the DB interface unit 102*a* itself depending on the table to be accessed. When the DB access request to the DB 121 occurs, the DB interface unit 102*a* outputs the DB access request to the allocation unit 103 to enable the browser 111 to perform the DB access by proxy. On the other hand, when the DB access request to the DB 181 occurs, the DB interface unit 102*a* itself transmits the DB access request to the DB server 180.

The DB access to the DB 181 takes the round trip time (RTT) or longer between the Web server 100 and the DB server 180. The DB access to the DB 121 takes a time longer than the sum of the RTT between the Web server 100 and the client machine 110 and the RTT between the client machine 110 and the DB server 120.

The external network 150 is more practically a LAN of a SaaS vender or an ASP. Therefore, the RTT between the Web server 100 and the DB server 180 is much shorter than the RTT between the Web server 100 and the client machine 110. That is, the time taken for the DB access to the DB 181 is much shorter than the time taken for the DB access to the DB 121.

The details are described later, but it is preferable to determine by considering the difference in time taken for the DB access as to which is better to store data, in the DB 121 or in the DB 181.

In the example in FIG. 18, the Web server 100 is different from the DB server 180, but depending on the embodiments, one server can physically function as the Web server 100 and the DB server 180. On the other hand, the DB server 180 can physically function as a plurality of servers for distribution of loads.

FIG. 19 is an explanatory flowchart of the operation of the DB interface unit 102*a* of a variation example.

In step S1101, the DB interface unit 102*a* waits for the reception of the DB access request from the Web application 101. Step S1101 is similar to step S201 in FIG. 6.

Upon receipt of the DB access request from the Web application 101 to the DB interface unit 102*a*, control is passed to step S1102. In step S1102, the DB interface unit 102*a* refers to the location information 107 of the setting file 106*c*.

In the next step S1103, the DB interface unit 102*a* confirms in which database the table requested by the DB access request is included, the DB 121 or the DB 181. If the table requested by the DB access request is included in the DB 181 on the Internet side as viewed from the client machine 110, control is passed to step S1104. On the other hand, if the table requested by the DB access request is included in the DB 121 in the intranet 140, control is passed to step S1105.

For example, when the DB interface unit 102*a* receives from the Web application 101 the DB access request to the "goods" table or the "cart" table, control is passed to step S1104. On the other hand, when the DB interface unit 102*a* receives from the Web application 101 the DB access request to the "client" table or the "order" table, control is passed to step S1105.

In step S1104, the DB interface unit 102*a* accesses the DB server 180 directly, and acquires the DB access result, thereby passing control to step S1107.

On the other hand, in step S1105, the DB interface unit 102*a* outputs the DB access request received from the Web application 101 to the allocation unit 103 as in step S202 in FIG. 6.

Then, in step S1106, the DB interface unit 102*a* waits for the reception of the DB access result from the allocation unit 103 as in step S203 in FIG. 6. Upon receipt of the DB access result from the allocation unit 103 to the DB interface unit 102*a*, control is passed to step S1107.

In step S1107, the DB interface unit 102*a* returns the DB access result to the Web application 101 as in step S204 in FIG. 6, thereby returning control to step S1101.

Described next is the merit of the variation example illustrated in FIGS. 18 and 19. The merit of the variation example illustrated in FIGS. 18 and 19 is that both of the DB 121 and the DB 181 are available depending on the characteristic of the data.

There are various types of Web applications 101, and various types of data available by the Web application 101. It is preferable that data of a certain type is stored in the DB 121 in the intranet 140, and data of another type is stored in the DB 181 in the DB server 180 directly accessible from the Web server 100.

For example, it is preferable that highly confidential data such as the personal information, order history, etc. of clients is stored in the DB 121 because a corporative user does not like highly confidential data to be stored externally to the intranet 140 for fear of the risk of information leakage from the external network 150. In the example of the location information 107 in FIG. 17, the "client" table including the personal information about a client and the "order" table including the order history of a client are entered in the item of the "table name on the intranet".

On the other hand, the example of the data appropriately stored in the DB 181 is data of low confidentiality whose damage is limited although it is revealed, or data without confidentiality which has been published. For example, when the Web application 101 is an application of online shopping, the data of the goods is not confidential because the goods are published.

The data of the "cart" table may be, for example, the data only for temporary association of client ID with the ID of goods. Then, although the data of the "cart" table is revealed, the personal information such as the name and the address of the client is not revealed, thereby limiting the damage. A limited damage may be permitted. Therefore, in the example of the location information 107 in FIG. 17, the "goods" table and the "cart" table are entered in the item of the "table name on the Internet".

Which is preferable for data to be stored in the DB 121 or in the DB 181 depends on the point of view other than the confidentiality of data.

For example, the frequently accessed data (that is, frequently read and written data) is appropriately stored in the DB 181 because the communications of (E1) through (E4) below are established for the Web application 101 to use the data stored in the DB 121.

(E1) is a communication of transmitting the DB access request from the allocation unit 103 of the Web server 100 to the browser 111 of the client machine 110.

(E2) is a communication of transmitting the DB access request from the browser 111 to the DB server 120.

(E3) is a communication of transmitting the DB access result from the DB server 120 to the browser 111.

(E4) is a communication of transmitting the DB access result from the browser 111 to the allocation unit 103.

That is, when frequently accessed data is stored in the DB 121, the communications (E1) through (E4) are performed each time frequent access occurs. As a result, the communication traffic between the Web server 100 and the client machine 110, and in the intranet 140 increases. The increase of the communication traffic may cause an undesired influence on other network applications.

Obviously, the communications are accompanied with delays. Furthermore, as described above, the RTT between the Web server 100 and the client machine 110 is much longer than the RTT between the Web server 100 and the DB server 180.

Therefore, the user response time is longer in the case in which the data in the DB 121 is used than in the case in which the data in the DB 181 is used. The "user response time" refers to the time from the user operation such as clicking, inputting, etc. on the page in the iframe 112 to the display of the contents of the response returned from the Web application 101 in the iframe 112.

As described above, it is preferable that the frequently accessed data is stored in the DB 181 from the view point of suppressed communication traffic and user convenience although the data is small.

Contrarily, rarely accessed data does not impair the user convenience although it is stored in the DB 121. The communication traffic caused by the access to rarely accessed data is low per unit time although the data itself is relatively large.

Depending on the SaaS vender (or ASP), the user is charged based on the amount of data stored in the DB 181. Then, it is preferable that large data is stored in the DB 121 from the view point of cost.

For example, data of certain type may be rarely referenced while new entries are sequentially generated and increase in amount. For example, log data of certain type is accumulated as a large amount of data, but may be rarely referenced. Thus, it may be preferable that large data which is rarely referenced is stored in the DB 121 from the viewpoint of cost. Then, the rarely referenced data does not impair the communication traffic and user convenience by being stored in the DB 121, even if the data is large.

As described above, various types of data are different from various points of view in which is preferable for the data to be stored, in the DB 121 or the DB 181. According to the variation example illustrated in FIGS. 18 and 19, the Web application 101 can use the data stored in both of the DB 121 and the DB 181 in the environment in which each piece of data is stored in a more appropriate DB, the DB 121 or the DB 181, depending on the characteristic of the data.

In addition, it is not necessary for the Web application 101 to determine in which DB the data is stored, the DB 121 or the DB 181. That is, the location of the data is hidden from the Web application 101. Therefore, the Web application 101 can issue the DB access request using the same logic for the data in the DB 121 and the data in the DB 181. Therefore, the existing Web application 101 can be available in the system illustrated in FIG. 18.

For simplicity in the explanation above illustrated in FIG. 19, it is assumed that when one DB access request is issued, access is requested to only the table in the DB 121, or only the table in the DB 181. However, one DB access request may refer to access to both of the "order" table in the DB 121 and the "goods" table in the DB 181. For example, when the FROM clause in the SELECT statement of the SQL specifies both of the "order" table and the "goods" table, the SELECT statement refers to the DB access request for access to both of the DB 121 and the DB 181.

When one DB access request refers to the access to both of the table in the DB 121 and the table of the DB 181, the DB interface unit 102a can perform, for example, the following processes (F1) through (F3).

(F1) is a process of generating a DB access request for only the table in the DB 121 from the DB access request received from the Web application 101, and performing the processes in steps S1105 and S1106 using the generated DB access request.

(F2) is a process of generating a DB access request for only the table in the DB 181 from the DB access request received from the Web application 101, and performing the process in step S1104 using the generated DB access request.

(F3) is a process of generating a final DB access result from the DB access results obtained in the processes (F1) and (F2) depending on the type and combination conditions of the table combination in the DB access request received from the Web application 101.

The process (F1) can be performed first or the process (F2) can be performed first depending on the combination condition (for example, the condition specified in the WHERE clause of the SQL statement) specified in the DB access request output from the Web application 101. Otherwise, depending on the combination condition, the processes (F1) and (F2) can be performed in parallel.

Furthermore, the process (F3) practically includes a cartesian product, a narrowing operation (that is, a selecting operation) based on the condition specified by the DB access request output from the Web application 101, etc.

The present invention is not limited to the embodiment above. Some variations are described in the explanation above, but the embodiment above can be further varied variously from the following aspects. The variations above and below can be arbitrarily combined so far as they do not conflict with one another.

The first aspect of the variation relates to a data structure. For example, FIG. 2 illustrates the correspondence table 105a in table form as a practical example of the correspondence table 105. However, the data structure of the correspondence table 105 is optional depending on the embodiment, and an associative array, a linear list, and other arbitrary data structure are available.

In addition, FIGS. 2 and 17 illustrate the setting files 106a through 106c in table form as practical examples of the setting file 106. However, the format of the setting file 106 is arbitrarily determined depending on the embodiments. The setting file 106 can include both of the private key and the location information 107.

The second aspect of the variation refers to processing of a plurality of DB access requests. When the generation of one page is accompanied with a plurality of DB access requests, a series of processes in steps S417 through S427 in FIG. 8B, or a series of processes in steps S818 through S826 in FIG. 13B can be repeated the number of times equal to the number of DB access requests. However, the Web application 101 can be output to the DB interface unit 102 once as a group of the plurality of DB access requests.

For example, when the generation of a page is accompanied with the execution of five SQL statements, a series of processes in steps S417 through S427 or a series of processes in steps S818 through S826 can be repeated five times. However, the Web application 101 can separate the five SQL statements by the delimiter character ";", and output a coupled character string to the DB interface unit 102 in step S417 or S818.

Then, the DB access request transmitted from the DB interface unit 102 to the allocation unit 103, from the allocation unit 103 to the browser 111, and from the browser 111 to the DB server 120 is expressed by the character string obtained by coupling the five SQL statements. Then, the DB server 120 executes the five SQL statements, and obtains the respective DB access results for the five SQL statements. Then, the DB server 120 combines the five DB access results in the appropriate format, and the combination of the five DB access results are transmitted to the browser 111 by one HTTP reply.

Then, the combination of the five DB access results is transmitted from the browser 111 to the allocation unit 103, from the allocation unit 103 to the DB interface unit 102, and from the DB interface unit 102 to the Web application 101.

The Web application 101 extracts each of the five DB access results, generates a page based on each extracted DB access result, and returns the generated page to the browser 111.

As described above, the plurality of DB access requests can be transmitted together as a group, and a plurality of corresponding DB access results can be returned together as a group. Then, the effect of reducing the communication traffic can be acquired between the Web server 100 and the client machine 110, and between the client machine 110 and the DB server 120, thereby successfully shortening the user response time.

The third aspect of the variation relates to the type of DB. The DB 121 and the DB 181 can be a relational DB, but can also be any other type of DB. For example, an extensible markup language database (XMLDB) or a key-value store (KVS) can be used. Depending on the type of DB, a different inquiry language expressing the DB access request is used.

The fourth aspect of the variation relates to a practical implementation of a cross domain asynchronous communication. In the explanation above, an embodiment using an HTTP communication using an XHR object is described in detail. However, the practical implementation can be varied according to the embodiment.

For example, for the cross domain asynchronous communication, an implementation using the XHR object at the level 2 as described above can be used. However, depending on the embodiment, an implementation using a JavaScript object notation with padding (JSONP) or XDomainRequest (XDR) object can be adopted.

The fifth aspect of the variation relates to a timeout. Relating to maintaining the Comet connection, the explanation is omitted in the description above, but the connection can be disconnected due to the timeout. Thus, an appropriate variation for preventing a timeout, or an appropriate variation for transmitting the HTTP request again to the browser 111 at the timeout can be applied to the embodiment above.

For example, if the DB access request is not received from the DB interface unit 102 for a specified or longer time, the allocation unit 103 in the first embodiment can transmit a chunk including appropriate dummy data as a new chunk of the child page 400. The function definition 603 in the second embodiment can include a code for re-transmitting the HTTP request for long polling when there occurs a timeout of the HTTP request for long polling.

The sixth aspect of the variation relates to a practical implementation of the allocation unit 103 and the DB interface unit 102. The practical implementation can be varied depending on the embodiment.

For example, an example of the allocation unit 103 storing a session ID using a thread local variable is explained above, but any other implementation can be adopted for the allocation unit 103 to recognize a session ID. For example, depending on the embodiment, the session ID can be stored in the call stack.

The seventh aspect of the variation relates to the DB access proxy script 114. In the transmission of the child page 400 exemplified in FIG. 9 relating to the first embodiment, the chunk 401 including the address assign statement 402 and the function definition 403 is transmitted first. Then, each time the DB access request occurs, a short <script> block including only a function invoke statement is transmitted. Thus, using the function definition 403, communication traffic between the Web server 100 and the client machine 110 can be suppressed in the first embodiment.

However, if there is no problem with increasing communication traffic, the following variation can be used. That is, the first chunk 401 can be realized without a <script> block.

Instead, each time the DB access request occurs, all <script> blocks including (G1) through (G3) can be generated by the script generation unit 104, and transmitted to the browser 111 by the allocation unit 103.

(G1) address assign statement 402

(G2) assign statement for assigning a character string of the SQL statement indicating a DB access request to the variable sql (G3) script having the contents similar to those of the function definition 403

Otherwise, in FIG. 9, there is the address assign statement 402 outside the function definition 403, and in FIG. 14, there is the address assignment statement 601 outside the function definition 602. However, depending on the embodiment, the function execute1 or the function execute2 can be varied to receive the address of the DB server in the intranet 140 as an argument.

Although FIG. 1 illustrates only one DB server 120, but there can be a plurality of DB servers in the intranet 140. The setting file 106 can store the address (that is the URI) of the DB server in the intranet 140 for each table name.

Then, the script generation unit 104 according to the first embodiment can be varied as follows.

That is, when the allocation unit 103 specifies the SQL statement indicating the DB access request, the script generation unit 104 refers to the setting file 106, and designates the address of the DB server to be accessed. Then, the script generation unit 104 generates an invoke statement of the function execute1 including the designated address as an argument.

Otherwise, the allocation unit 103 and the script generation unit 104 can be varied as follows.

The allocation unit 103 transmits the address of the DB server to be accessed depending on the DB access request to the browser 111 when it transmits the DB access request to the browser 111. The allocation unit 103 designates the address of the DB server to be accessed by referring to the setting file 106.

The script generation unit 104 generates the function definition 603 of the main routine varied as follows. That is, the function main according to the present variable example is defined so that the address of the DB server with the SQL statement indicating the DB access request is extracted from the HTTP reply, and the function execute2 can be invoked using the extracted SQL statement and the address as arguments.

A function name and a variable name can be arbitrarily changed depending on the embodiment.

The eighth aspect of the variation relates to a reserved path.

In the first embodiment, as indicated by step S605 in FIG. 11, a load request of the child page 400 and a notification of the DB access result are distinguished by methods. However, the load request of the child page 400 and the notification of the DB access result can be distinguished by a path according to the second embodiment.

That is, the first embodiment can be varied so that two reserved path can be used. Then, the allocation unit 103 can determine from only the path included in the URI specified by the received HTTP request whether the received HTTP request refers to a load request for the child page 400, a notification of the DB access result, or the request for the Web application 101.

On the other hand, in the second embodiment, the three paths (B1) through (B3) are reserved and used, but two paths can be reserved.

For example, the path for the iframe 113 of (B1) can be the same as the path for notification of the DB access result of (B3). In this case, the GET method is specified by the request to load the child page 600 to the iframe 113, and the POST method is specified by the notification of the DB access result. Therefore, the allocation unit 103 can distinguish the load request of the child page 600 from the notification of the DB access result based on the methods.

Otherwise, the path for the iframe 113 of (B1) can be the same as the path for the reception of the HTTP request for long polling of (B2). As a method for the HTTP request for long polling, the GET method is used in the second embodiment, but the long polling can be performed when the POST method is used.

When the path of (B1) is the same as the path of (B2), the GET method is specified at the request to load the child page 600 to the iframe 113, and the POST method can be specified at the HTTP request for long polling. The allocation unit 103 can ignore the message body of the HTTP request for long polling, and set the character string (for example, an SQL statement) indicating the DB access request in the message body of the HTTP reply when the HTTP reply is simply returned. The allocation unit 103 can distinguish the load request of the child page 600 from the HTTP request for long polling based on the methods.

Practical examples of a path in the present specification and drawings are only exemplifications. A path arbitrarily determined depending on the embodiment can be used as a "specific path" for a "specific request". As in the second embodiment, three paths (B1) through (B3) are reserved, the three paths can be arbitrarily determined.

For example, the path such as "/reservedForComet" etc. exemplified above is a path immediately below the document root of the Web server 100, but a path not immediately below the document root is available. Furthermore, the path exemplified above does not include an extension, but obviously a path including an extension is available.

A path and a method are used to distinguish the types of the HTTP requests received by the allocation unit 103 from the browser 111. However, an embodiment in which the types of the HTTP requests can be distinguished by combining a path included in the URI and a query string can be realized.

The ninth aspect of the variation relates to multi-tenancy. In the explanation above, whether or not the Web application 101 accommodates to a multi-tenant environment is not specifically referred to. However, in the following variation, the embodiment above can be applied to a multi-tenant Web application 101.

That is, a plurality of setting files 106 prepared for respective tenants are stored in the Web server 100. As described above, one, two, or three reserved paths are used depending on the embodiment, but a different path is reserved for each tenant. Furthermore, the Web server 100 stores in advance for each tenant the information for association among the ID of the tenant, the path reserved for the tenant, and the setting file 106 for the tenant.

Then, upon receipt of the HTTP request, the allocation unit 103 can recognize the tenant whose browser 111 has transmitted the HTTP request depending on the tenant for which the path has been reserved at the received HTTP request. Therefore, when the allocation unit 103 instructs the script generation unit 104 to generate a script, it can correctly instruct which the setting file 106 a DB address should be read from.

Furthermore, using the URI including the private IP address in the setting file 106 as illustrated in FIG. 2 is effective in holding the security in the multi-tenant environment because access can be performed by the browser of the first tenant using the private IP address only in the intranet for the first tenant although the browser of the first tenant accesses the path reserved for the second tenant. That is, although the browser of the first tenant accesses the path reserved for the second tenant, the DB server of the second tenant is not accessed from the browser of the first tenant.

Furthermore, in the multi-tenant environment, the allocation unit 103 determines the tenant to which the browser 111 belongs, and performs the process depending on the tenant. Since the HTTP request is capsulated in the IP packet, the allocation unit 103 can determine the tenant to which the browser 111 belongs from the source IP address of the HTTP request received from the browser 111.

The tenth aspect of the variation relates to the browser 111. The browser 111 in FIG. 1 can be a general-purpose Web browser. However, a client called a "rich client" other than a general-purpose Web browser can replace the browser 111. The server side application accommodating to the rich client can also replace the Web application 101.

Although the rich client replaces the browser 111, a connection is established when the rich client transmits a specific request to the Web server. Through the established connection, the Web server transmits the DB access request to the rich client. Then, the rich client performs the DB access by proxy according to the DB access proxy script, and transmits the DB access result to the Web server.

Described below is a supplement to the tenth aspect described above.

The Web server 100 is an example of the control device on the server side for controlling the DB access. The client machine 110 or the browser 111 is an example of a client.

Then, the allocation unit 103 is an example of the first reception device for accepting a specific request for access to a specific path from the client. The allocation unit 103 is also an example of an establishment device for establishing a connection between the client and the control device when the specific request is received by the first reception device.

The DB interface unit 102 and the allocation unit 103 cooperates to act as a second reception device for accepting from an application a DB access request for access to the DB by the application to be accessed by the client.

Furthermore, the allocation unit 103 including the script generation unit 104 also acts as the following transmission device. The script is to enable the client to access the DB at the DB access request, acquire the DB access result from the DB, and transmit the DB access result to the control device. The transmission device transmits the DB access request by including it in the script or separately from the script to the client through the connection established by the establishment device.

Furthermore, the DB interface unit 102 and the allocation unit 103 cooperate to act as an output device for receiving the DB access result from the client and outputting the DB access result to the application.

The various embodiments are described above including variation examples, but the embodiments have the following advantages.

First, the Web application 101 can perform a process using the data of the DB 121 in the intranet 140, but the data of the DB 121 is not accumulated on the external network 150 in a non-volatile manner. Therefore, there is few risks of information leakage from the external network 150.

Second, it is not necessary to provide an additional device such as a relay server etc. other than the Web server 100 and the client machine 110. Therefore, each of the above-mentioned embodiments excels in cost, serviceability, availability, etc.

Third, it is not necessary to change the settings of the firewall 130. Erroneously changing the settings of the firewall 130 often makes a security hole. Therefore, requiring no setting change is an advantage.

The advantages exemplified above are effective in promoting the use of the Web application 101 for the following reasons.

Recently, there are increasing number of cases in which a corporation uses a Web application provided by a SaaS vender etc. through the Internet instead of deploying and using the Web application in the intranet of the corporation. On the other hand, the corporation does not like to store confidential information in the external network.

However, according to each of the above-mentioned various embodiments, the DB 121 is stored in the intranet 140 of a corporation, and the Web application 101 of the external network 150 is available. Therefore, each of the above-mentioned embodiments is effective in promoting the use of the Web application 101 by a corporative user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a program used to direct a first computer to perform a control process, the control process comprising:
   accepting, from a second computer, a path access request to access a path that is reserved on the first computer and predetermined not to be used by an application that is executed on the first computer and is to be accessed from the second computer;
   establishing a connection between the second computer and the first computer when the path access request is accepted;
   accepting a first database access request of the application for access to a first database, from the application;
   transmitting to the second computer an execute instruction script for enabling the second computer to execute a proxy process of accessing the first database at the first database access request, acquiring a first database access result from the first database, and transmitting the first database access result to the first computer;
   enabling the second computer to perform the proxy process by transmitting the first database access request by including the first database access request in the execute instruction script or separately from the execute instruction script to the second computer through the connection;
   receiving the first database access result from the second computer;
   outputting the first database access result to the application;
   accepting from the second computer an access request for access to the first computer;
   determining whether or not there is a session corresponding to the access request;
   when there is no session,
   generating a new session;
   transmitting to the second computer a first code for enabling the second computer to access the path, and a second code for enabling the second computer to display a page of the application;
   when there is a session,
   storing the established connection as associated with the session on a storage device if the access request is the path access request; and
   outputting the access request to the application if the access request is a request to the application.

2. The computer-readable, non-transitory medium according to claim 1, wherein: the first code specifies the path as a source of a first frame; and the second code enables the second computer to display the page of the application in a second frame.

3. The computer-readable, non-transitory medium according to claim 1, wherein: the control process further comprises: recognizing session identification information for identification of the session upon receipt of the first database access request from the application; and designating the connection associated with the session identified by the session identification information by searching the storage device; and the execute instruction script including the first database access request is transmitted to the second computer through the designated connection.

4. The computer-readable, non-transitory medium according to claim 1, wherein the control process further comprises transmitting to the second computer through the connection a definition script including a definition of a function for the proxy process in advance before accepting the first database access request; and the execute instruction script includes a statement for specifying an argument indicating the first database access request and instructing an execution of the function.

5. The computer-readable, non-transitory medium according to claim 1, wherein the control process further comprises:
   accepting from the application a second database access request for access to a second database;
   accessing the second database at the second database access request;
   acquiring a second database access result from the second database; and
   outputting the second database access result to the application.

6. The computer-readable, non-transitory medium according to claim 5, wherein
   the control process further comprises for each database access request accepted from the application:
   referring to location information for associating identification information about each table included in the first database with the first database, and for associating identification information about each table included in the second database with the second database; and
   determining according to the location information whether the database access request refers to access to the first database or the second database.

7. The computer-readable, non-transitory medium according to claim 1, wherein:
   the control process further comprises transmitting a signature to the second computer;
   access from the second computer to the first database in the proxy process includes transmitting the signature received by the second computer from the first computer to a third computer for managing the first database; and
   the signature is used in an authenticating process by the third computer.

8. A control device comprising:
a network connection device configured to accept, from a client, a path access request for access to a path that is reserved on the control device and predetermined not to be used by an application to be accessed from the client; and
a processor configured
to execute the application, to establish a connection between the client and the control device when the network connection device accepts the path access request,
to accept from the application a database access request for access to a database by the application,
to cause the network connection device to transmit to the client a script for enabling the client to execute a process of accessing the database at the database access request, acquiring a database access result from the database, and transmitting the database access result to the control device,
to cause the network connection device to transmit the database access request by including the database access request in the script or separately from the script to the client through the connection,
to determine whether or not there is a session corresponding to an access request that the network connection device accepts from the client for access to the control device,
when there is no session,
to generate a new session, and
to cause the network connection device to transmit to the client a first code for enabling the client to access the path, and a second code for enabling the client to display a page of the application,
when there is a session,
to store the established connection as associated with the session on a storage device if the access request is the path access request,
to output the access request to the application if the access request is a request to the application, and
to output the database access result to the application when the network connection device receives the database access result from the client.

9. A controlling method for a first computer, the controlling method comprising:
accepting, from a second computer, a path access request to access a path that is reserved on the first computer and predetermined not to be used by an application that is executed on the first computer and is to be accessed from the second computer;
establishing a connection between the second computer and the first computer when the path access request is accepted;
accepting a database access request of the application for access to a database, from the application;
transmitting to the second computer a script for enabling the second computer to execute a process of accessing the database at the database access request, acquiring a database access result from the database, and transmitting the database access result to the first computer;
enabling the second computer to perform the process by transmitting the database access request by including the database access request in the script or separately from the script to the second computer through the connection;
receiving the database access result from the second computer;
outputting the database access result to the application;
accepting from the second computer an access request for access to the first computer;
determining whether or not there is a session corresponding to the access request;
when there is no session,
generating a new session;
transmitting to the second computer a first code for enabling the second computer to access the path, and a second code for enabling the second computer to display a page of the application;
when there is a session,
storing the established connection as associated with the session on a storage device if the access request is the path access request; and
outputting the access request to the application if the access request is a request to the application.

* * * * *